(12) United States Patent
You et al.

(10) Patent No.: US 11,328,331 B2
(45) Date of Patent: May 10, 2022

(54) METHODS, DEVICES, AND SYSTEMS FOR SENDING AND RECEIVING VIRTUAL GOODS

(71) Applicant: Tencent Technology (Shenzhen) Company Limited, Shenzhen (CN)

(72) Inventors: Xiaotong You, Shenzhen (CN); Li Huang, Shenzhen (CN); Chao Zhou, Shenzhen (CN); Chen Gong, Shenzhen (CN); Yaya Liu, Shenzhen (CN); Canhui Huang, Shenzhen (CN)

(73) Assignee: Tencent Technology (Shenzhen) Company Limited, Shenzhen (CN)

( * ) Notice: Subject to any disclaimer, the term of this patent is extended or adjusted under 35 U.S.C. 154(b) by 692 days.

(21) Appl. No.: 16/266,270

(22) Filed: Feb. 4, 2019

(65) Prior Publication Data
US 2019/0172110 A1 Jun. 6, 2019

Related U.S. Application Data

(62) Division of application No. 15/111,454, filed as application No. PCT/CN2015/079269 on May 19, 2015, now Pat. No. 10,255,626.

(30) Foreign Application Priority Data

May 19, 2014 (CN) .......................... 201410212221.5

(51) Int. Cl.
*G06Q 30/06* (2012.01)
*G07F 17/32* (2006.01)
(Continued)

(52) U.S. Cl.
CPC ......... *G06Q 30/0601* (2013.01); *G06Q 20/10* (2013.01); *G06Q 20/123* (2013.01); *G07F 17/3281* (2013.01); *H04L 67/42* (2013.01)

(58) Field of Classification Search
CPC .. G06Q 30/0601; G06Q 20/10; G06Q 20/123; G06F 17/3281; H04L 67/42
See application file for complete search history.

(56) References Cited

U.S. PATENT DOCUMENTS 7,349,890 B1 3/2008 Pathak et al.
2001/0018680 A1 8/2001 Park et al.
(Continued)

FOREIGN PATENT DOCUMENTS

CN 101159054 A 4/2008
CN 102063678 A 5/2011
(Continued)

OTHER PUBLICATIONS

ISR and Written Opinion to PCT/CN2015/079269, dated Jul. 28, 2015, pp. 1-10.
(Continued)

*Primary Examiner* — Kristie D Shingles
(74) *Attorney, Agent, or Firm* — Crowell & Moring LLP

(57) ABSTRACT

A method and device for sending and receiving virtual goods are provided. A client device may communicate with a server. The client device may receive a receiving link from the server. The server may generate the receiving link in response to an invocation request received by the server from an invoker device that is different from the recipient client device after a total amount of the virtual goods in an invoker account corresponding to the invoker device is successfully transferred to a server account corresponding to the server. The receiving link may include instructions configured to cause the recipient client device to request a virtual goods package from the server. The client device may detect the link is triggered. The client device may request, from the server, in response to link being triggered, the virtual goods package. The client device may accept, by the (Continued)

recipient client device, the virtual goods package by interacting with the server via the receiving link.

20 Claims, 21 Drawing Sheets

(51) Int. Cl.
  *G06Q 20/10* (2012.01)
  *G06Q 20/12* (2012.01)
  *H04L 67/01* (2022.01)

(56) References Cited

U.S. PATENT DOCUMENTS

| | | |
|---|---|---|
| 2003/0074305 A1 | 4/2003 | Gallon |
| 2003/0218062 A1 | 11/2003 | Noriega et al. |
| 2005/0004869 A1 | 1/2005 | Rig |
| 2006/0294005 A1 | 12/2006 | Drepak |
| 2007/0038567 A1* | 2/2007 | Allaire .............. H04N 21/812 705/50 |
| 2007/0087820 A1 | 4/2007 | Van Luchene et al. |
| 2009/0253475 A1 | 10/2009 | Thompson et al. |
| 2010/0076778 A1 | 3/2010 | Kondrik et al. |
| 2011/0145163 A1 | 6/2011 | Kurra et al. |
| 2013/0211944 A1 | 8/2013 | Momin et al. |
| 2013/0311356 A1 | 11/2013 | Ho et al. |
| 2014/0052617 A1* | 2/2014 | Chawla .............. G06Q 10/10 705/39 |
| 2014/0172961 A1 | 6/2014 | Clemmer et al. |
| 2016/0234302 A1* | 8/2016 | Wu .............. G06Q 20/386 |

FOREIGN PATENT DOCUMENTS

| | | |
|---|---|---|
| CN | 102779312 A | 11/2012 |
| CN | 103270525 A | 8/2013 |
| CN | 101390413 B | 9/2013 |
| CN | 103312757 A | 9/2013 |

OTHER PUBLICATIONS

First Office Action to Chinese Application No. 2014102122215, dated Mar. 24, 2016, pp. 1-8.

* cited by examiner

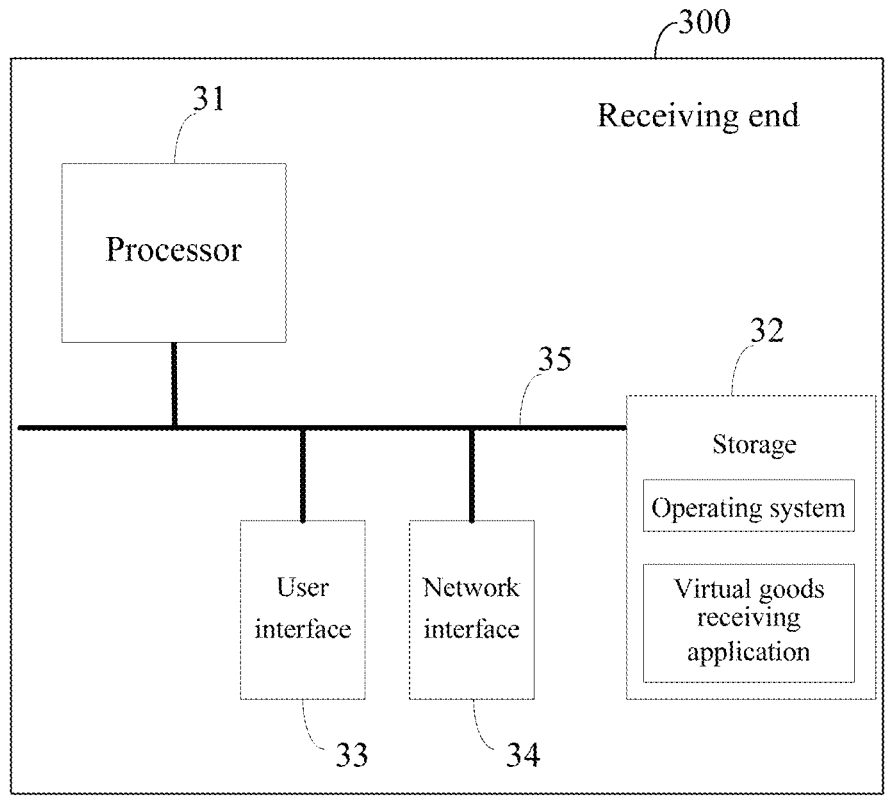

Figure 18

The recipient client receives a receiving link sent by the server. Based on an invocation request received from the virtual goods package generation interface, the server transfers the virtual goods corresponding to the total amount of the virtual goods in the invocation request in the account corresponding to the invoker client to the account corresponding to the server and, upon success of virtual goods transfer, generates a virtual goods package and the receiving link used to receive the virtual goods package. — S401

By using the receiving link, the recipient client interacts with the server to receive the virtual goods package. — S402

Figure 19

METHODS, DEVICES, AND SYSTEMS FOR SENDING AND RECEIVING VIRTUAL GOODS

CROSS-REFERENCE TO RELATED APPLICATIONS

This application is divisional of U.S. application Ser. No. 15/111,454, filed Jul. 13, 2016, which claims priority to PCT Application No. PCT/CN2015/079269, filed May 19, 2015, which claims priority to Chinese Patent Application No. 201410212221.5, filed on May 19, 2014, all of which are hereby incorporated by reference in their entirety.

FIELD

The present disclosure relates to the field of the Internet technologies, particularly to a method and virtual goods sending device, and a method, device, and system for receiving virtual goods.

BACKGROUND

With the development of network technologies, a wide variety of virtual goods have emerged, including gears, pets, and virtual currencies in cyber games.

For example, when giving away virtual goods using "red envelopes", a user can add virtual goods, such as cakes, greeting cards, and cash gifts, to "red envelopes" and send the "red envelopes" to his or her friends. With a typical method for receiving and sending virtual goods by using a "red envelope", the sender first selects a recipient, who usually is a friend of the sender's in a cyber community or on an instant messaging application; the sender then adds to a "red envelope" the virtual goods to be sent and finally sends to the recipient the "red envelope" including the virtual goods. After receiving the "red envelope", the recipient can obtain the virtual goods included in it.

However, when the number of recipients is large, sending virtual goods to each of the recipients takes many operations and a long time. In addition, the sender needs to repeat the above-mentioned operations each time he or she sends an envelope, which also takes many operations and much time. Therefore, the efficiency of sending virtual goods by using the prior art is low.

SUMMARY

One of the main purposes of the embodiments of the present disclosure is to improve the efficiency of sending virtual goods by providing a method and virtual goods sending device and a method, device, and system for receiving virtual goods.

In a first aspect, the embodiments of the present disclosure provide a method for sending virtual goods, including the following steps implemented by a server including a processor and a non-transitory storage medium accessible to the processor:

On detecting an invocation request from the virtual goods package generation interface, the server obtains the virtual goods package generation parameters included in the invocation request; the virtual goods package generation parameters include the type of the virtual goods package, the quantity of virtual goods packages, total amount of virtual goods, and the recipient's client that receives the virtual goods. The server transfers the virtual goods corresponding to the total amount of the virtual goods in the account corresponding to the invoker's client to the account corresponding to the server. Upon success of virtual goods transfer, the server, based on the virtual goods package generation parameters, generates a virtual goods package and a link for receiving the virtual goods package. The server sends the receiving link to the recipient client so that the recipient client, by using the receiving link, interacts with the server to receive the virtual goods package.

In a second aspect, the embodiments of the present disclosure further provides a method for receiving virtual goods, including the following steps:

The recipient client receives a receiving link sent by the server. Based on an invocation request received from the virtual goods package generation interface, the server transfers the virtual goods corresponding to the total amount of the virtual goods in the account corresponding to the invoker client to the account corresponding to the server and, upon success of virtual goods transfer, generates a virtual goods package and the receiving link programmed to receive the virtual goods package. By using the receiving link, the recipient client interacts with the server to receive the virtual goods package.

In a third aspect, the embodiments of the present disclosure further provide a virtual goods sending device, including: an interface invocation module, a virtual goods package generation module, and a virtual goods package distribution module. The interface invocation module is programmed to, on detecting an invocation request from the virtual goods package generation interface, obtain the virtual goods package generation parameters included in the invocation request, where the virtual goods package generation parameters include the type of the virtual goods package, the quantity of virtual goods packages, total amount of virtual goods, and the recipient client that receives the virtual goods. The virtual goods package generation module is programmed to transfer the virtual goods corresponding to the total amount of the virtual goods in the account corresponding to the invoker client to the account corresponding to the server and, upon success of virtual goods transfer, generate a virtual goods package and a link for receiving the virtual goods package based on the virtual goods package generation parameters. The virtual goods package distribution module is programmed to send the receiving link to the recipient client so that the recipient client interacts with the server to receive the virtual goods package by using the receiving link.

In a fourth aspect, the embodiments of the present disclosure further provide a virtual goods receiving device, including: a link acquisition module and an interactive reception module. The link acquisition module is programmed to receive a receiving link sent by the server. Based on an invocation request received from the virtual goods package generation interface, the server transfers the virtual goods corresponding to the total amount of the virtual goods in the account corresponding to the invoker client to the account corresponding to the server and, upon success of virtual goods transfer, generates a virtual goods package and the receiving link programmed to receive the virtual goods package. The interactive reception module is programmed to interact with the server to receive the virtual goods package by using the receiving link.

The embodiments of the present disclosure further provide a virtual goods receiving and sending system, which includes the above-mentioned recipient client and server, the server connected to the recipient client by using a wired network or wireless network.

With the embodiments of the present disclosure, the server provides a virtual goods package generation interface that may be invoked to send virtual goods packages. This simplifies user operations and greatly reduces the time taken for user operations, improving the efficiency of sending virtual goods packages. In addition, data security problems due to improper user operations are avoided.

BRIEF DESCRIPTION OF THE DRAWINGS

To describe the solutions in the embodiments of the present disclosure more clearly, the following briefly introduces the accompanying drawings needed for describing the embodiments or the prior art. Apparently, the accompanying drawings in the following description show some embodiments of the present disclosure, and persons of ordinary skill in the art may still derive other drawings from these accompanying drawings without creative efforts.

FIG. 18 is a structural diagram for the recipient client provided by the prevent disclosure.

FIG. 19 is the flowchart of the method provided by the present disclosure for receiving virtual goods.

DETAILED DESCRIPTION OF THE DRAWINGS

Figure 1:
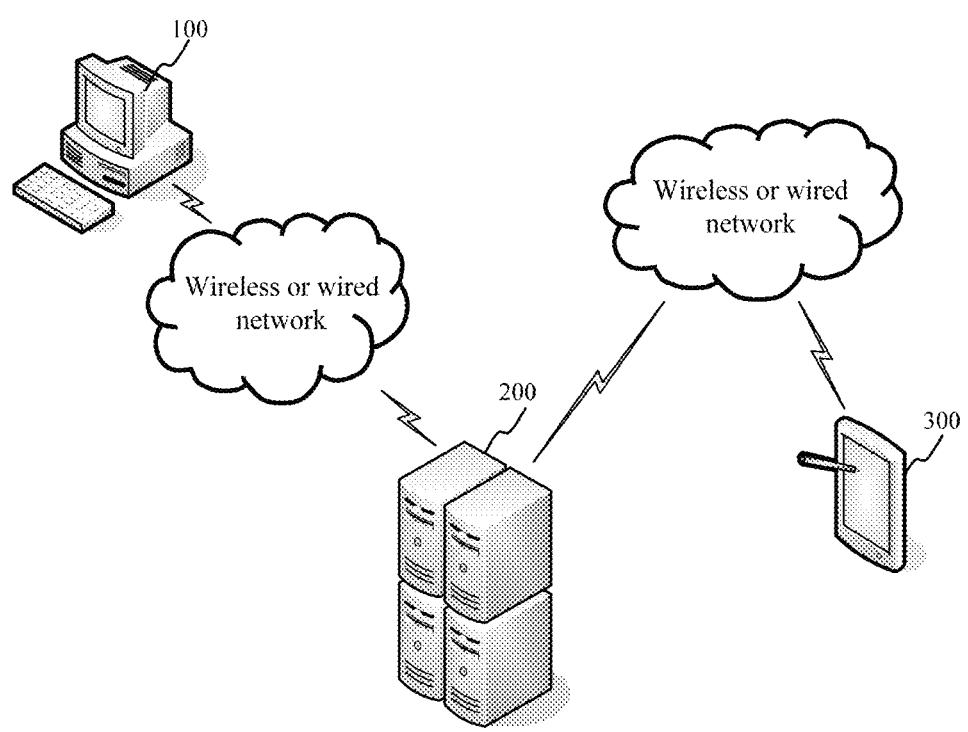
FIG. 1 is a structural diagram for an implementation environment related to the present disclosure.

Reference throughout this specification to "one embodiment," "an embodiment," "example embodiment," or the like in the singular or plural means that one or more particular features, structures, or characteristics described in connection with an embodiment is included in at least one embodiment of the present disclosure. Thus, the appearances of the phrases "in one embodiment" or "in an embodiment," "in an example embodiment," or the like in the singular or plural in various places throughout this specification are not necessarily all referring to the same embodiment. Furthermore, the particular features, structures, or characteristics may be combined in any suitable manner in one or more embodiments.

The terminology used in the description of the disclosure herein is for the purpose of describing particular examples only and is not intended to be limiting of the disclosure. As used in the description of the disclosure and the appended claims, the singular forms "a," "an," and "the" are intended to include the plural forms as well, unless the context clearly indicates otherwise. Also, as used in the description herein and throughout the claims that follow, the meaning of "in" includes "in" and "on" unless the context clearly dictates otherwise. It will also be understood that the term "and/or" as used herein refers to and encompasses any and all possible combinations of one or more of the associated listed items. It will be further understood that the terms "may include," "including," "comprises," and/or "comprising," when used in this specification, specify the presence of stated features, operations, elements, and/or components, but do not preclude the presence or addition of one or more other features, operations, elements, components, and/or groups thereof.

As used herein, the term "module" or "unit" may refer to, be part of, or include an Application Specific Integrated Circuit (ASIC); an electronic circuit; a combinational logic circuit; a field programmable gate array (FPGA); a processor (shared, dedicated, or group) that executes code; other suitable hardware components that provide the described functionality; or a combination of some or all of the above, such as in a system-on-chip. The term module or unit may include memory (shared, dedicated, or group) that stores code executed by the processor.

The exemplary environment may include a server, a client, and a communication network. The server and the client may be coupled through the communication network for information exchange, such as sending/receiving identification information, sending/receiving data files such as splash screen images, etc. Although only one client and one server are displayed in the environment, any number of terminals or servers may be included, and other devices may also be included.

The communication network may include any appropriate type of communication network for providing network connections to the server and client or among multiple servers or clients. For example, communication network may include the Internet or other types of computer networks or telecommunication networks, either wired or wireless. In a certain embodiment, the disclosed methods and apparatus may be implemented, for example, in a wireless network that includes at least one client.

In some cases, the client may refer to any appropriate user terminal with certain computing capabilities, such as a personal computer (PC), a work station computer, a server computer, a hand-held computing device (tablet), a smart phone or mobile phone, or any other user-side computing device. In various embodiments, the client may include a network access device. The client may be stationary or mobile.

A server, as used herein, may refer to one or more server computers configured to provide certain server functionalities, such as database management and search engines. A server may also include one or more processors to execute computer programs in parallel.

A user, as used herein, may refer to one or more persons or things that control a client. The user may control more than one client or other devices.

The technical solutions in the embodiments of the present disclosure are clearly and completely described in the following with reference to the accompanying drawings in the embodiments of the present disclosure. Apparently, the embodiments to be described are merely a part rather than all of the embodiments of the present disclosure. All other embodiments obtained by persons of ordinary skill in the art based on the embodiments of the present disclosure without creative efforts shall fall within the protection scope of the present disclosure.

The following further describes the technical solution provided by the present disclosure based on drawings and particular embodiments. It should be understood that the description of particular embodiments is intended only to explain, instead of limiting, the present disclosure.

FIG. 1 shows the structural diagram for an implementation environment related in each embodiment of the present disclosure. The implementation environment comprises the invoking device 100, the server 200, and the receiving device 300.

The invoking device 100 may include a social networking application or the web client of a social networking application, which may also be referred as an invoker client. The invoking device 100 may be a mobile phone, tablet PC, iPad, eBook reader, laptop, or desk computer. The invoker client 100 and server 200 are interconnected using a wireless network or wired network. The server 300 may be a server, a server cluster comprising multiple servers, or a cloud computing service center. The client of a social networking application or the web client of a social networking application, called the recipient client, runs on the receiving device 300. The receiving device 300 may be a mobile phone, tablet PC, iPad, eBook reader, laptop, or desk computer. The receiving client 300 and server 200 are interconnected using a wireless network or wired network. Both the invoker client and recipient client are clients of social networking applications, for example, WeChat client, QQ client, and other social network client.

The server 200 is a server corresponding to the client a social networking application. The server may be a stand-alone server or a server cluster including multiple servers. The server 200 further provides a virtual goods package generation interface. By invoking the virtual goods package generation interface, the invoker client sends the corresponding parameters to the server 200. Based on the parameters sent by the invoker client, the server 200 automatically generates a virtual goods package and transfers the corresponding virtual goods from the account corresponding to the invoker client to the account corresponding to the server 200. Upon completion of virtual goods transfer, the server 200 sends the generated virtual goods package to the recipient client. Thus, data processing is completed automatically, without the need of many manual operations.

Note that, in each of the embodiment of the present disclosure, the virtual goods involved may be game gears, game materials, game pets, game currencies, icons, membership, titles, value-added services, credits, game gold, gold beans, gift vouchers, exchange certificates, discount coupons, greeting cards, and cash. All the following embodiments are described assuming that the virtual goods package is cash in a "red envelope."

Figure 2:
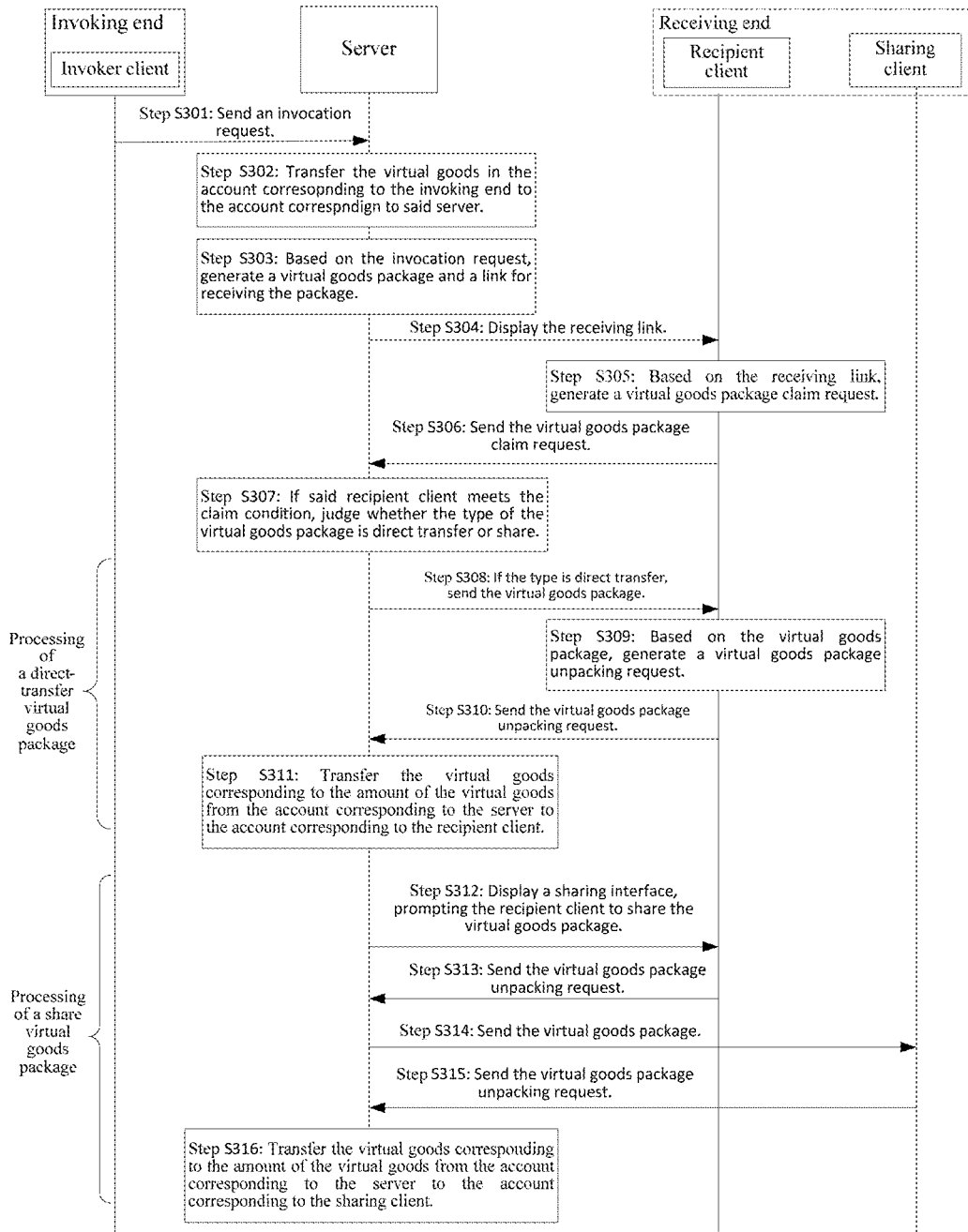
FIG. 2 is the flowchart of an embodiment of the method provided by the present disclosure for receiving and sending virtual goods.

FIG. 2 shows an example method provided by the present disclosure for receiving and sending virtual goods. The method provided by the embodiments for receiving and sending virtual goods includes the following steps:

Step S301: The invoker client sends an invocation request to the server to invoke the virtual goods package generation interface provided by the server.

In the embodiments, the invocation request is sent by the invoker client to invoke the virtual goods package generation interface. For example, the invoking device 100 can log on to the invoker client and set the corresponding invoking condition on the server 200. When the invoking condition is met, the server 200 automatically invokes the virtual goods package generation interface. The invocation request includes virtual goods package generation parameters, which may include the type of the virtual goods package, the quantity of virtual goods packages, total amount of virtual goods, and the recipient client that receives the virtual goods. Share virtual goods packages mean that at least two virtual goods packages are sent to the same recipient client. In addition, the recipient client may need to claim the packages together with other recipient clients, and the quantity of virtual goods in each share virtual goods package may be fixed or generated randomly. Fixed quantity generation means that when subsequently interacting with the recipient client for reception, the server 200 evenly distributes the quantity of virtual goods in each virtual goods package based on s, namely, the total amount of virtual goods and n, namely, the quantity of virtual goods packages. Random quantity generation means that when subsequently interacting with the recipient client for reception, the server 200 randomly generates the quantities of the virtual goods in each virtual goods package. Direct-transfer of virtual goods means that one virtual goods package corresponds to one recipient client and the quantity of virtual goods in the direct-transfer virtual goods package is fixed.

Step S302: Based on the invocation request, the server transfers the virtual goods in the account corresponding to the invoker client to the account corresponding to the server.

On receiving an invocation request from the virtual goods package generation interface, the server 200 automatically transfers the virtual goods in the account corresponding to the invoker client to the account corresponding to the server 200. Upon completion of virtual goods transfer, the server 200 returns the transfer result to the invoker client.

Step S303: After virtual goods transfer is completed, the server, based on the invocation request, generates a virtual goods package and a receiving link programmed to receive the virtual goods package.

Upon completion of virtual goods transfer, the server 200, based on the invocation request, generates the corresponding virtual goods package, which includes at least one piece of virtual goods. Then, the server 200 locally stores the virtual goods package and generates a receiving link based on the link to the virtual goods package; the recipient client may use the receiving link to receive the virtual goods package.

An invocation request includes virtual goods package generation parameters, which include the quantity of virtual goods packages, total amount of virtual goods, the type of the virtual goods package, and information about the recipient client. The type of the virtual goods package may be share or direct transfer. In addition, the quantity of the virtual goods in a share virtual goods package is fixed or generated randomly. The server 200 generates the corresponding virtual goods package based on the virtual goods package generation parameters.

Step S304: The server sends the receiving link to the recipient client.

Figure 3:
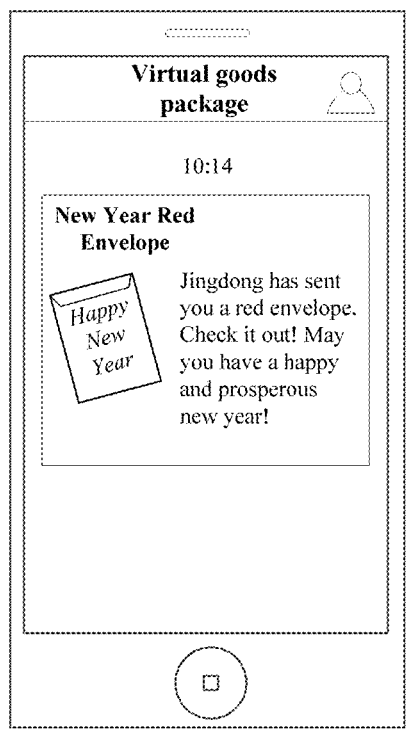
FIG. 3 is a sample graph of a receiving link generated by the server based on an invocation request for a virtual goods package and displayed on the recipient client by using the method provided by the present disclosure for receiving and sending virtual goods.

The server may instruct the recipient client to display the receiving link on a display of the recipient client. The receiving link may be displayed in one of multiple forms, for example, an instant message, group message, social networking application message, microblog message, and two-dimension code. As shown in FIG. 3, the receiving link is displayed as an instant message.

Step S305: The recipient client generates a virtual goods package claim request based on the receiving link.

For example, when a user clicks on or presses the receiving link, the recipient client extracts the information included in the receiving link and generates a virtual goods package claim request carrying the identifier of the recipient client.

Step S306: The recipient client sends the virtual goods package claim request to the server.

The recipient client sends the virtual goods package claim request to the server 200 so that the server 200 verifies the recipient client.

Step S307: On detecting that the recipient client meets the claim condition, the server checks whether the type of the virtual goods package is direct transfer or share. If the type is direct transfer, Step S308 is performed; if the type is share, Step 312 is performed.

The above-mentioned claim condition is used for the server 200 to check whether the recipient client that sent the virtual goods package claim request has authorization to claim the virtual goods package. For example, the claim condition may comprise: the recipient identifier is one of the recipient identifiers corresponding to the recipient clients in the virtual goods package generation parameters, and the remaining amount of the virtual goods package is not zero; or, the recipient identifier is one of the recipient identifiers corresponding to the recipient clients in the virtual goods package generation parameters, the remaining amount of the virtual goods package is not zero, and the recipient client has not received the virtual goods package.

Step S308: On detecting that the type of the virtual goods package corresponding to the virtual goods package claim request is direct transfer, the server sends the virtual goods package to the recipient client.

Figure 4:
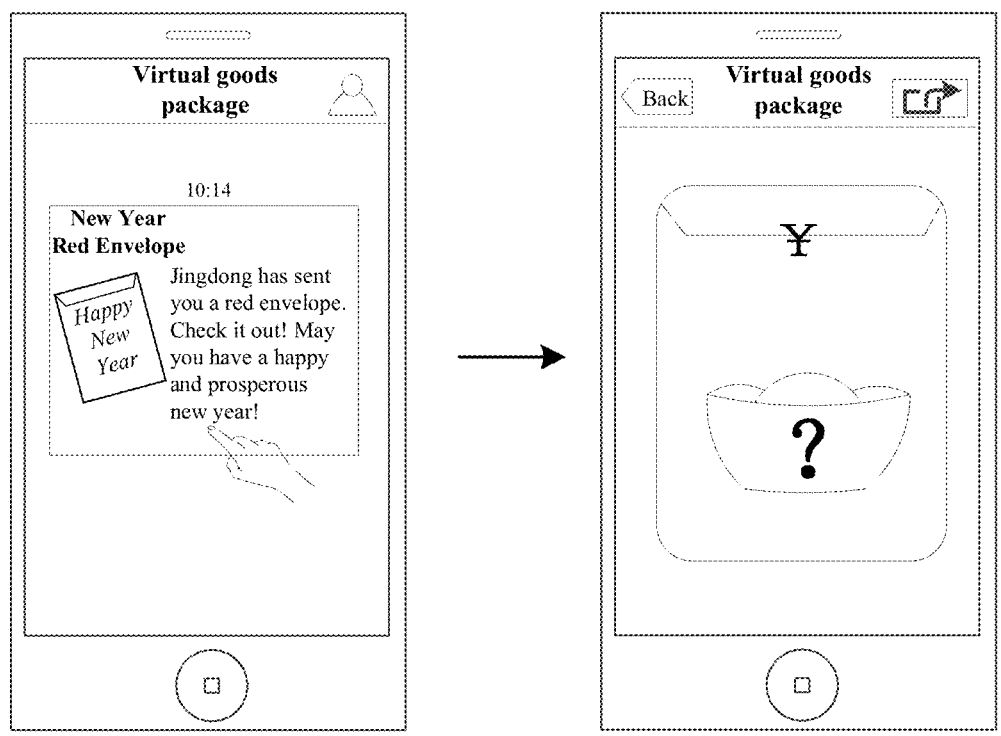
FIG. 4 is a schematic diagram for the operation of claiming a direct-transfer virtual goods package on the recipient client by using the method provided by the present disclosure for receiving and sending virtual goods.

As shown in FIG. 4, on detecting that the type of the virtual goods package corresponding to the virtual goods package claim request is direct transfer, the server obtains the virtual goods package and sends the virtual goods package to the recipient client for displaying the virtual goods package on the recipient client.

Step S309: The recipient client generates a virtual goods package unpacking request based on the virtual goods package.

Step S310: The recipient client sends the virtual goods package unpacking request to the server 200.

The virtual goods package includes virtual goods. Therefore, if the recipient client needs to obtain the virtual goods in the virtual goods package after receiving the virtual goods package, the recipient client needs to send a virtual goods package unpacking request to the server. A virtual goods package unpacking request includes the virtual goods package identifier of the virtual goods package. In this case, the server 200 receives the virtual goods package unpacking request.

Step S311: Based on the virtual goods package unpacking request, the server transfers the virtual goods corresponding to the amount of the virtual goods from the account corresponding to the server to the account corresponding to the recipient client.

Figure 5:
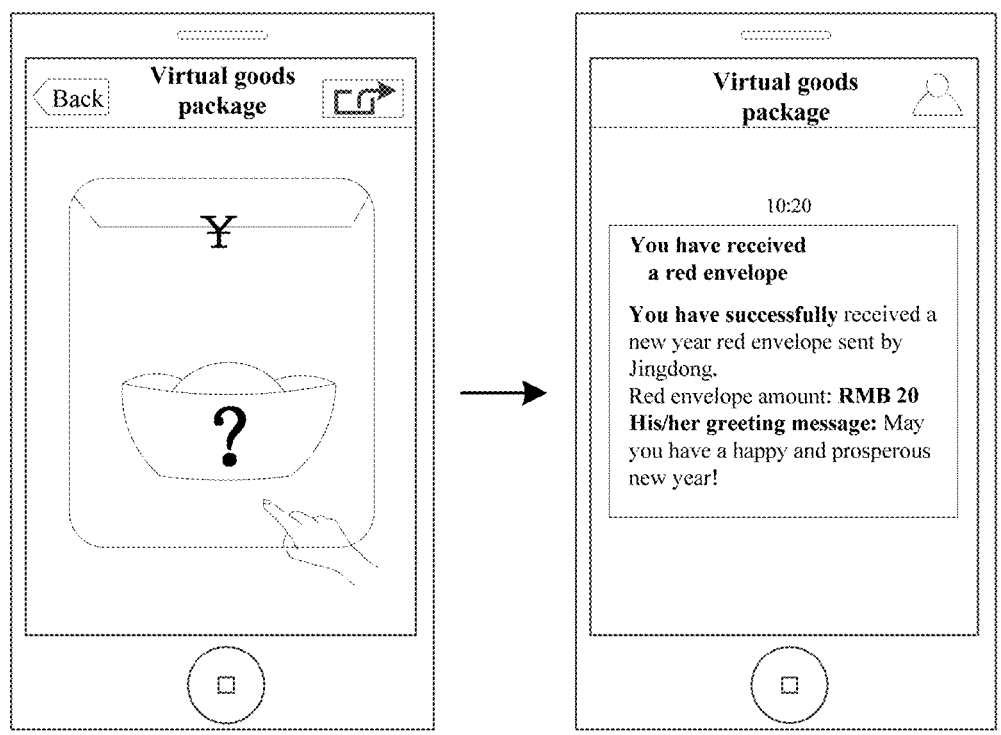
FIG. 5 is a schematic diagram for the operation of claiming the virtual goods in the received virtual goods package on the recipient client by using the method provided by the present disclosure for receiving and sending virtual goods.

When the server generates a virtual goods package, the corresponding relation between the virtual goods package identifier and virtual goods package parameters has been stored on the server. Therefore, based on the corresponding relation, the server may obtain the virtual goods package parameters corresponding to the virtual goods package identifier included in the virtual goods package unpacking request and obtain the quantity of the virtual goods in the virtual goods package based on the virtual goods package parameters. Then, the server transfers the virtual goods corresponding to the amount of the virtual goods in the account corresponding to the server to the account corresponding to the recipient client. Upon transfer completion, the server returns a message to the recipient client, as shown in FIG. 5.

Step S312: On detecting that the type of the virtual goods package corresponding to the virtual goods package claim request is share, the server displays a sharing interface to the recipient client, prompting the recipient client to share the virtual goods package.

Figure 6:
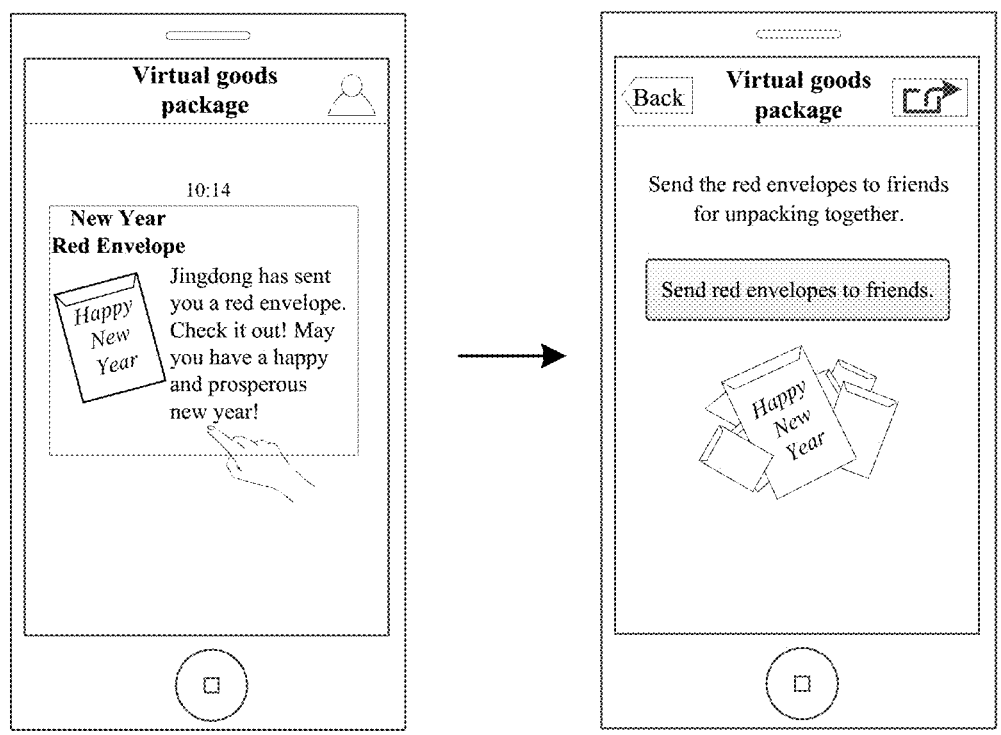
FIG. 6 is a schematic diagram for the operation performed to claim a share virtual goods package on the recipient client by using the method provided by the present disclosure for receiving and sending virtual goods.

As shown in FIG. 6, when the type of the virtual goods sent to the recipient client is share and the quantity of virtual goods packages available for sharing is 5, the receiving link is displayed as the message "Jingdong has sent you five red envelopes . . . " When the receiving link is clicked, the recipient client generates a virtual goods package claim request and sends it to the server. On receiving the virtual goods package claim request, the server displays a sharing interface to the recipient client, prompting the recipient client to unpack the package together with friends.

Step S313: The recipient client sends to the server a virtual goods package sharing request including the sharing client information.

Based on the display interface, the recipient client adds the corresponding friend, namely, the sharing client and generates a virtual goods package sharing request for sharing the virtual goods package with other friends.

Step S314: Based on the virtual goods package sharing request, the server sends the virtual goods package to the sharing client.

Step S315: The sharing client sends a virtual goods package unpacking request to the server.

Step S316: The server transfers the virtual goods corresponding to the amount of the virtual goods from the account corresponding to the server to the account corresponding to the sharing client.

Figure 7:
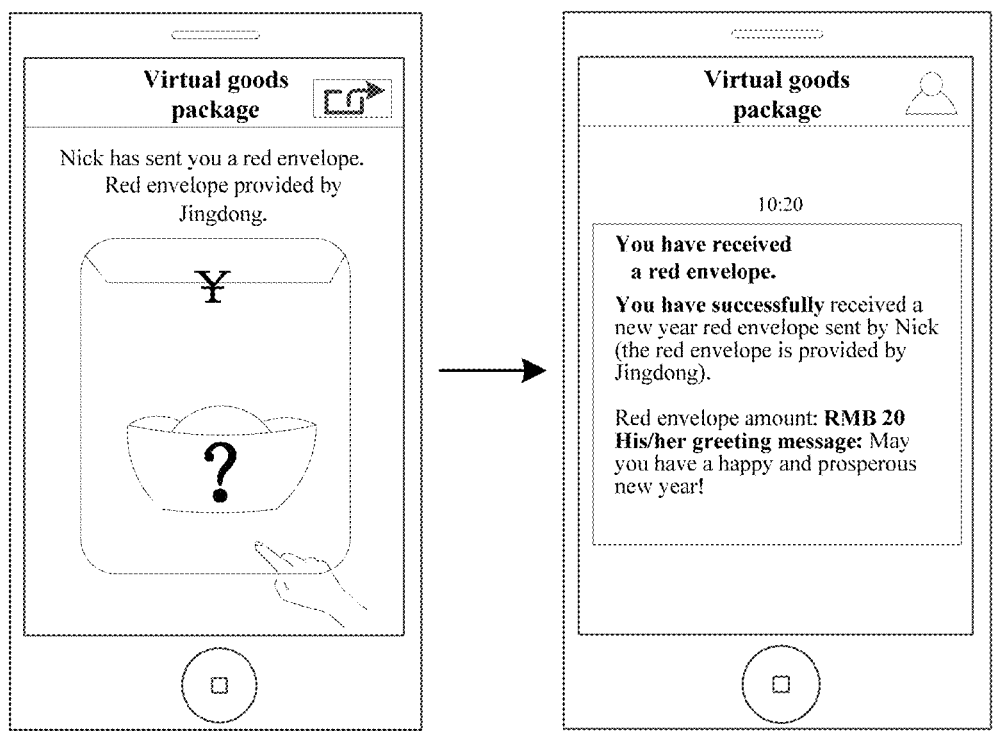
FIG. 7 is a schematic diagram for the operation of claiming the virtual goods in the received virtual goods package on the sharing client by using the method provided by the present disclosure for receiving and sending virtual goods.

As shown in FIG. 7, on receiving a virtual goods package sharing request, the server sends the virtual goods package to the sharing client for displaying the virtual goods package on the sharing client. When the link to the virtual goods package is clicked, the sharing client sends the virtual goods package unpacking request to the server. Based on the virtual goods package unpacking request, the server transfers the virtual goods corresponding to the amount of the virtual goods from the account corresponding to the server to the account corresponding to the sharing client.

With the embodiments of the present disclosure, the server 200 provides a virtual goods package generation interface that may be invoked to send virtual goods packages. This simplifies user operations and greatly reduces the time taken for user operations, improving the efficiency of sending virtual goods packages. In addition, data security problems due to improper user operations are avoided.

Figure 8:
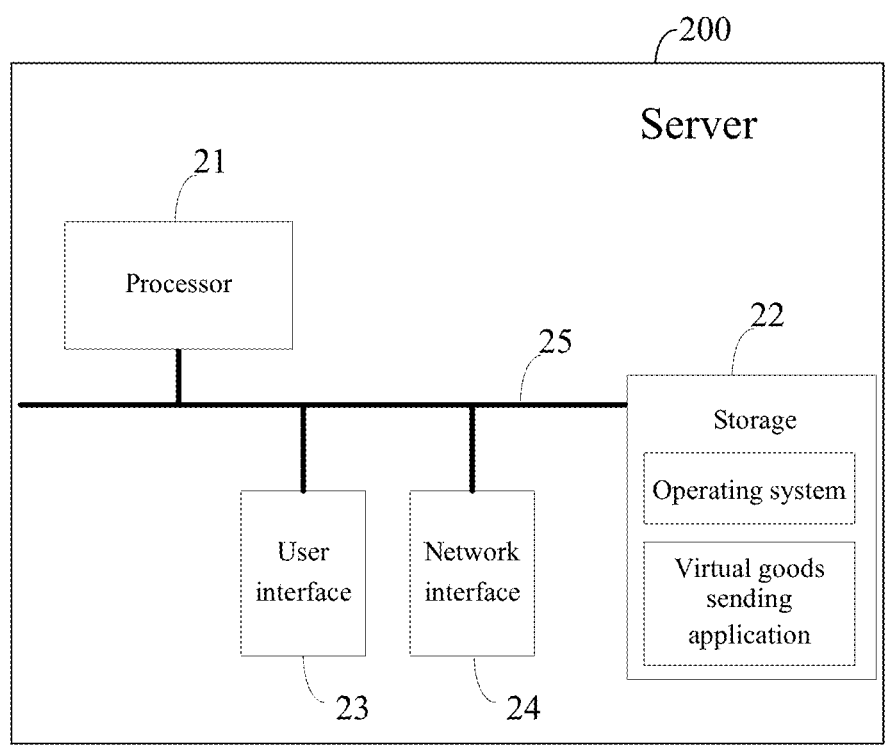
FIG. 8 is a structural diagram for the server provided by the prevent disclosure.

As shown in FIG. 8, the server 200 may comprise the processor 21, the storage 22, the user interface 23, the network interface 24, and the communication bus 25. The communication bus 25 is programmed to complete the communication among the components of the server. The user interface 23 may be a wired interface or wireless interface, programmed to connect input/output devices, such as a mouse, keyboard, and monitor, for receiving user-input information and displaying information. The network interface may also be a wired interface or wireless interface, used for the server 200 to communicate with the invoking device 100 and the receiving device 300. The storage 22 may comprise one or more computer-readable storage media. In addition, the storage 22 may be an internal storage or external storage. The storage 22 stores an operating system and a virtual goods sending application. The processor 21 is programmed to invoke the virtual goods sending application stored in the storage 22 so that the server sends the virtual goods.

Figure 9:
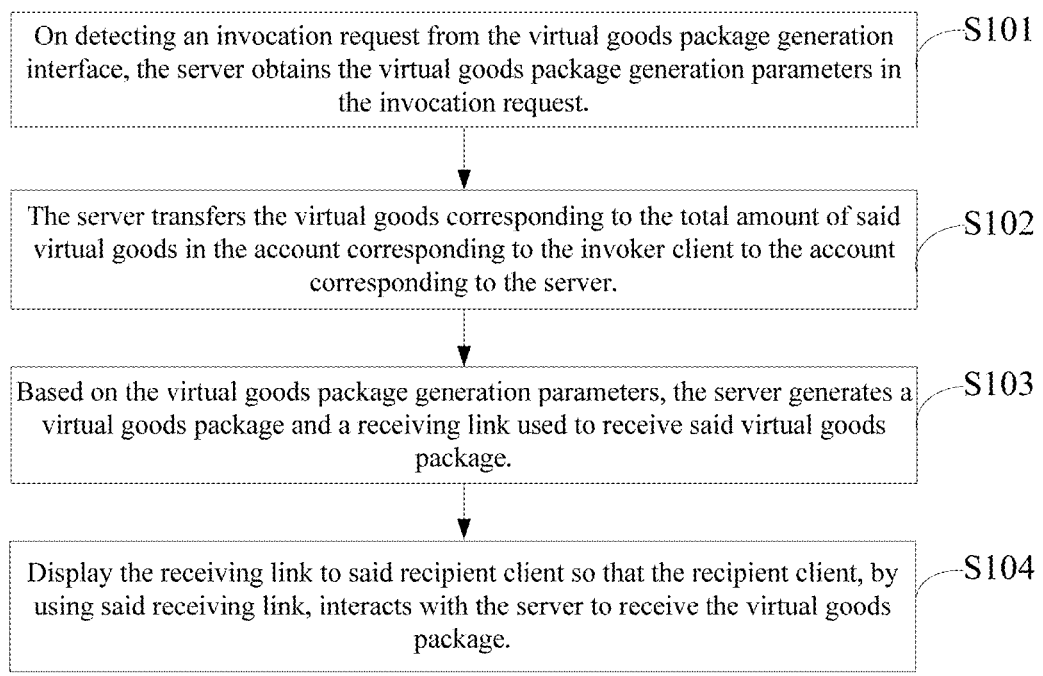
FIG. 9 is the flowchart of embodiments of the method provided by the present disclosure for sending virtual goods.

FIG. 9 shows an embodiment of the present disclosure that provides a method for sending virtual goods. This embodiment is described assuming that the method for sending virtual goods is used in the implementation environment as shown in FIG. 1 and FIG. 2. By invoking the virtual goods sending application stored in the storage 22, the processor 21 in the server 200 executes the method for sending virtual goods to send virtual goods. For example, the method for sending virtual goods comprises the following steps:

Step S101: On detecting an invocation request from the virtual goods package generation interface, the server obtains the virtual goods package generation parameters in the invocation request.

The invocation request may be sent by the invoker client to the server 200 to invoke the virtual goods package generation interface. The server 200 receives the invocation request by using the network interface 24. Then, the processor 21 responds to the invocation request and obtains the virtual goods package generation parameters in the invocation request. Certainly, the invoking device 100 may set the corresponding invoking condition on the server 200. When the invoking condition is met, the server 200 automatically invokes the virtual goods package generation interface. The virtual goods package generation parameters include the type of the virtual goods package, the quantity of virtual goods packages, total amount of virtual goods, and the recipient client that receives the virtual goods.

Step S102: The server transfers the virtual goods corresponding to the total amount of the virtual goods in the account corresponding to the invoker client to the account corresponding to the server.

The account corresponding to the invoker client may be a bank account or any other account that stores other virtual goods, for example, a game currency account.

Step S103: Based on the virtual goods package generation parameters, the server generates a virtual goods package and a receiving link programmed to receive the virtual goods package.

The server 200 responds to the invocation request of the virtual goods package generation interface and generates virtual goods packages based on the virtual goods package generation parameters. For example, based on the type of the virtual goods package and n, namely, the quantity of virtual goods packages, n virtual goods packages are generated. In addition, the type of the virtual goods packages is the same as the type of the virtual goods packages in the virtual goods package generation parameters. The sum of the quantities of the virtual goods in all the virtual goods packages is the same as the quantity of virtual goods packages in the virtual goods package generation parameters. In addition, the recipient client that receives the virtual goods packages is set to the recipient client specified in the virtual goods package generation parameters.

After generating a virtual goods package, the server 200 locally stores the generated virtual goods package and generates a receiving link based on the link to the virtual goods package on the server 200.

Step S104: The server sends the receiving link to the recipient client so that the recipient client, by using the receiving link, interacts with the server to receive the virtual goods package.

The server 200 sends the receiving link to the receiving device 300 to display the receiving link on the recipient client. The receiving link may be displayed in one of multiple forms, for example, an instant message, group message, social networking application message, microblog message, and two-dimension code. By using the receiving link, the receiving device 300 interacts with the server 200 to receive the virtual goods package.

With the embodiments of the present disclosure, the server 200 provides a virtual goods package generation interface that may be invoked to send virtual goods packages. This simplifies user operations and greatly reduces the time taken for user operations, improving the efficiency of sending virtual goods packages. In addition, data security problems due to improper user operations are avoided.

In Step S101, the invocation request from the virtual goods package generation interface may be initiated by the invoker client. In an embodiment, when the invoker client needs to invoke an invocation request on the virtual goods package generation interface provided by the server 200, virtual goods package generation parameters may be set. For example, the quantity of virtual goods in the virtual goods package is fixed to X; the type of the virtual goods package is share; and the recipient clients are all the social networking application clients associated with the invoker client. In this case, the server 200, based on the virtual goods package generation parameters, obtains m, namely, the number of social networking application clients associated with the invoking device. Then, the server 200 transfers the virtual goods with a quantity of X*m from the account corresponding to the invoking device 100 to the account corresponding to the server 200. Upon completion of virtual goods transfer, the server 200 generates m virtual goods packages; the quantity of the corresponding virtual goods in each of the virtual goods packages is X. Last, based on the generated virtual goods packages, the server 200 generates a receiving link and sends the receiving link to the corresponding recipient client so that the recipient client receives the virtual goods package.

In another embodiment, when the preset triggering condition on the invoking device 100 is met, the invocation request on the virtual goods package generation interface provided by the server 200 is invoked and virtual goods package generation parameters are set. For example, the amount of the virtual goods package is set to 1; the type of the virtual goods package is direct transfer; the total amount of virtual goods in the virtual goods package is s; and the recipient client is the social networking application client B. In this case, based on the virtual goods package generation parameters, the server 200 transfers the virtual goods with a quantity of s from the account corresponding to the invoker client to the account corresponding to the server 200. Upon completion of virtual goods transfer, the server 200 generates a virtual goods package based on the virtual goods package generation parameters. The quantity of the corresponding virtual goods in the virtual goods package is fixed to s. Last, based on the generated virtual goods package, the server 200 generates a receiving link and sends the receiving link to the social networking application client B so that the social networking application client B receives the virtual goods package.

Figure 10:
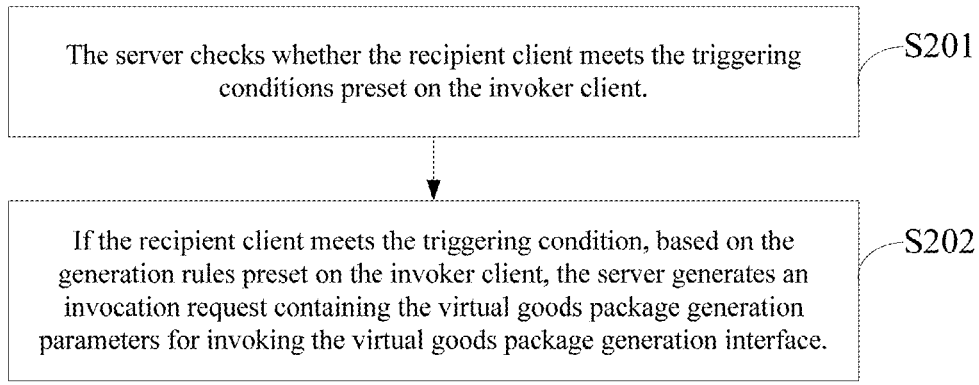
FIG. 10 is the flowchart in which the server invokes the virtual goods package generation interface by using the method provided by the present disclosure for sending virtual goods.

As shown in FIG. 10, the invocation request on the virtual goods package generation interface in Step S101 may be triggered by performing the following steps:

Step S201: The server checks whether the recipient client meets the preset triggering condition on the invoker client;

Step S202: If the recipient client meets the triggering condition, based on the preset generation rules on the invoker client, the server generates an invocation request including the virtual goods package generation parameters for invoking the virtual goods package generation interface.

The user logs in to the invoker client and sets the triggering condition. In addition, the user may also set the corresponding generation rules when the triggering condition is met. The preset generation rules include the total amount of virtual goods, quantity of virtual goods packages, and type of virtual goods packages corresponding to the triggering condition. The user-set triggering condition is stored on the server 200 for the server 200 to determine whether the recipient client meets the triggering condition. The user-set generation rules are stored on the server 200 for the server 200 to generate an invocation request including virtual goods package generation parameters based on the generation rules corresponding to the determined triggering condition.

With the embodiments, the triggering mechanism of invoking the virtual goods package generation interface is stored on a server. When the triggering mechanism is met, the server automatically invokes the virtual goods package generation interface. Thus, the efficiency of sending virtual goods packages is further improved, and data security problems due to improper user operations are avoided.

Further, the above-mentioned triggering condition includes: in the current virtual goods transfer, the quantity of the virtual goods in the account corresponding to the recipient client that are successfully transferred to the account corresponding to the triggering end of the invocation request reaches a first preset threshold; or, within a preset period of time, the accumulative quantity of the virtual goods in the account corresponding to the recipient client that are successfully transferred to the account corresponding to the triggering end of the invocation request reaches a second preset threshold.

For example, if user B displays and sells a type of commodities on a webpage and the trigger condition that the user B sets on the server 200 is that the amount of the current online payment is RMB 100; the generation rule corresponding to the triggering condition is that the total amount of the virtual goods is RMB 5; the quantity of virtual goods package is 1; and the type of the virtual goods package is direct transfer; a user buys user B's commodities within one month, and the total amount of online payment is RMB 500. The generation rule corresponding to the triggering condition is that the total amount of the virtual goods is RMB 50; the quantity of virtual goods packages is 5; the type of the virtual goods package is share and random. Thus, the server 200 makes judgment based on the triggering condition set by the user B.

For example, by using a social networking application client, user A buys the commodity M that user B displays on a webpage, and the amount of the commodity M is RMB 120. After user A makes online payment successfully by using the server 200, the server 200, detecting that the amount (RMB 120) of the online payment made by user A is larger than or equal to the user-preset amount (RMB 100), determines the social networking application client corresponding to user A as meeting the triggering condition and generates a virtual goods package; the type of the virtual goods package is direct transfer, and the amount of the virtual goods in the virtual goods package is RMB 5. In another example, by using a social networking application client, user A often buys the commodities that user B displays on a webpage, and the total amount of these commodities that user A buys within one month is RMB 550. Therefore, the server 200, determining the social networking application client corresponding to user A as meeting the triggering condition, generates five virtual goods packages. The type of the virtual goods packages is share;

the quantity of the virtual goods in each of the virtual goods packages is random; the total amount of the virtual goods in the five virtual goods packages is RMB 50. Each of the recipient clients of the virtual goods packages is the social networking application client corresponding to user A.

Further, a preset condition may comprise triggering conditions at multiple levels, and the corresponding generation rules apply when triggering conditions at multiple levels are met. For example, the triggering condition includes: in the current virtual goods transfer, the quantity of the virtual goods in the account corresponding to the recipient client that are successfully transferred to the account corresponding to the invoker client reaches a first preset threshold. The first preset threshold may include multiple values. When one of the values is reached, the corresponding generation rule applies. That is, the corresponding total amount of virtual goods, number of virtual goods packages, and type of the virtual goods packages apply.

It may be understood that the above-mentioned triggering condition may also be set depending on the actual conditions. For example, the validity period of the condition and time of triggering the virtual goods package generation interface may be set on the invoking device.

Figure 11:
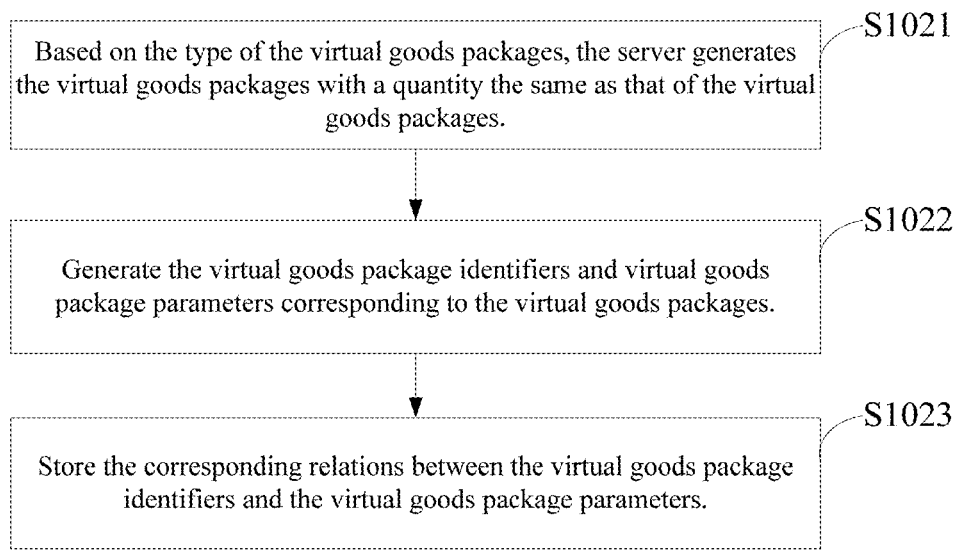
FIG. 11 is a detailed flowchart of generating a virtual goods package by using the method provided by the present disclosure for sending virtual goods.

FIG. 11 shows the second embodiment of the method provided by the present disclosure for sending virtual goods. The above-mentioned Step S103 includes the following steps:

Step S1031: The server generates a virtual goods package based on the virtual goods package generation parameters.

The virtual goods package generation parameters may include the type of the virtual goods package, the quantity of virtual goods packages, total amount of virtual goods, and the recipient client that receives the virtual goods packages. The type of the virtual goods packages may be share or direct transfer. In addition, the amount of the virtual goods in a share virtual goods package may be fixed or generated randomly. The following describes how share virtual goods packages and direct-transfer virtual goods packages are generated.

Example 1

Figure 12A:
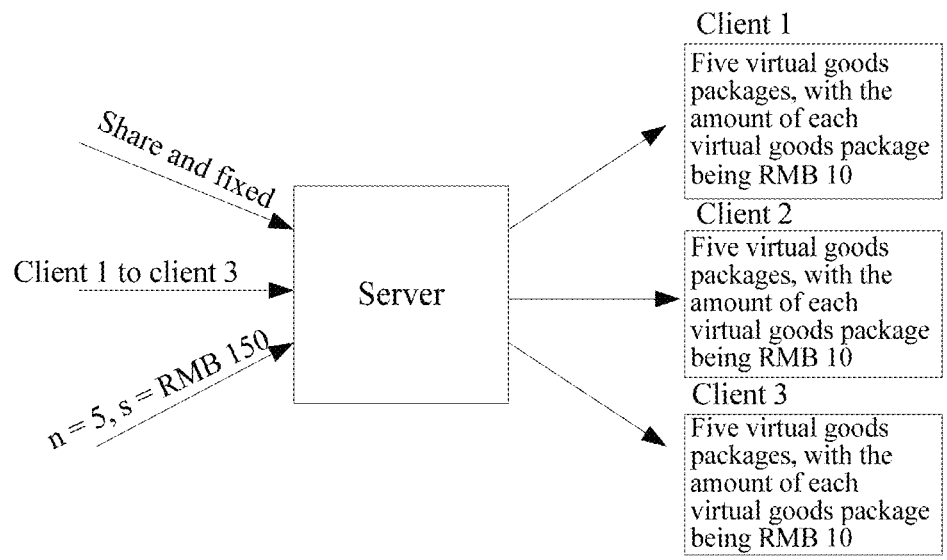
FIG. 12a is a schematic diagram for embodiments in which the server generates a virtual goods package based on the virtual goods package generation parameters by using the method provided by the present disclosure for sending virtual goods.

As shown in FIG. 12a, in the virtual goods package generation parameters, the type of virtual goods packages is share and fixed; n, namely, the number of virtual goods packages, is 5; s, namely, the total amount of the virtual goods, is RMB 150; the recipient clients of the virtual goods packages are client 1, client 2, and client 3. Based on the virtual goods package generation parameters, the server generates 15 virtual goods packages, and the amount of the virtual goods in each virtual goods package is RMB 10. Each client obtains five virtual goods packages, and the type of the virtual goods packages is share.

Example 2

Figure 12B:
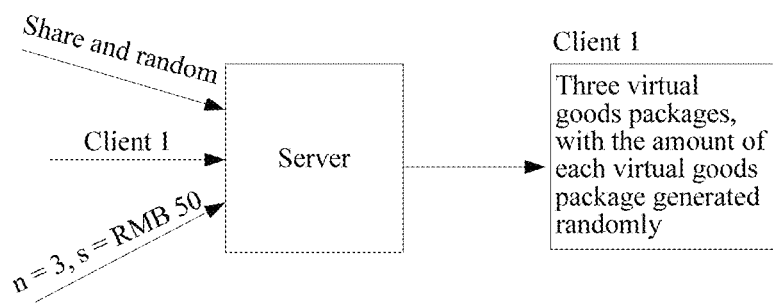
FIG. 12b is a schematic diagram for embodiments in which the server generates a virtual goods package based on the virtual goods package generation parameters by using the method provided by the present disclosure for sending virtual goods.

As shown in FIG. 12b, in the virtual goods package generation parameters, the type of virtual goods packages is share and random; n, namely, the number of virtual goods packages, is 3; s, namely, the total amount of the virtual goods, is RMB 50; the recipient client of the virtual goods packages are client 1. Based on the virtual goods package generation parameters, the server generates three virtual goods packages; the amount of the virtual goods in each virtual goods package is random; and the sum of the amounts of the virtual goods in the three virtual goods packages is RMB 50. Client 1 obtains three virtual goods packages, and the type of the virtual goods packages is share.

Example 3

Figure 12C:
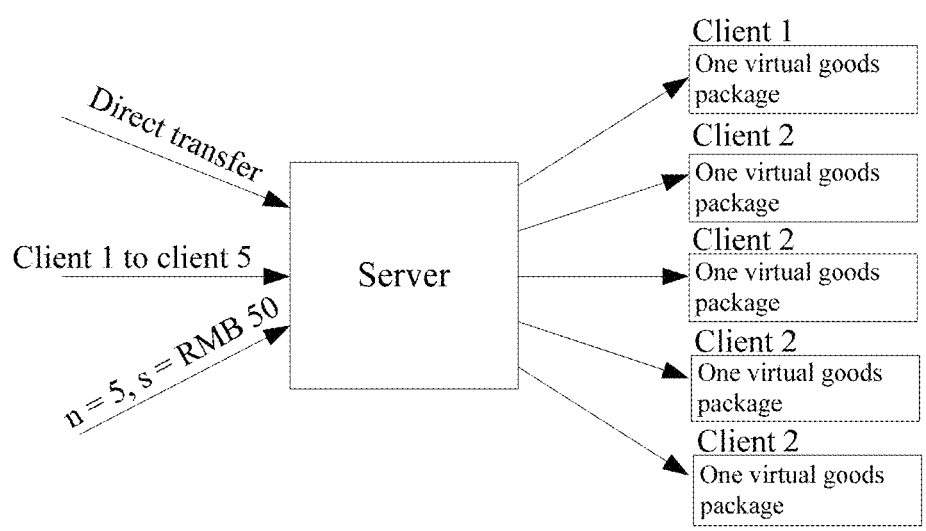
FIG. 12c is a schematic diagram for embodiments in which the server generates a virtual goods package based on the virtual goods package generation parameters by using the method provided by the present disclosure for sending virtual goods.

As shown in FIG. 12c, in the virtual goods package generation parameters, the type of virtual goods packages is direct transfer; n, namely, the number of virtual goods packages, is 5; s, namely, the total amount of the virtual goods, is RMB 50; the recipient clients of the virtual goods packages are client 1 to client 5. Based on the virtual goods package generation parameters, the server generates five virtual goods packages, and the amount of the virtual goods in each virtual goods package is fixed to RMB 10. Each client obtains one virtual goods package, and the type of the virtual goods package is direct transfer.

Step S1032: The server generates the virtual goods package identifiers and virtual goods package parameters corresponding to the virtual goods packages.

For the n virtual goods packages generated for the invocation request from the same virtual goods generation interface, the server 200 generates a virtual goods package identifier and stores the virtual goods package identifier, virtual goods package parameters, and the recipient identifier of the recipient client correspondingly. A virtual goods package identifier is programmed to uniquely identify the n virtual goods packages that an invocation request from a virtual goods package generation interface needs to generate. The virtual goods package identifier is generally a serial number consisting of numerals. The virtual goods package parameters include the quantity of virtual goods packages, total amount of virtual goods, and the type of the virtual goods packages.

Step S1033: The server stores the corresponding relations between the virtual goods package identifiers and the virtual goods package generation parameters and the recipient client identifiers;

The server stores the corresponding relations between the generated virtual goods package identifiers and virtual goods parameters. For example, Table 1 lists the corresponding relations between the virtual goods package identifiers, virtual goods package parameters, and recipient client identifiers programmed to generate virtual goods packages.

TABLE 1

| Virtual goods package identifier | Virtual goods package parameter | Recipient client identifier |
| --- | --- | --- |
| 20140128000001 | n = 5, s = 150, share and fixed | Client 1 to client 5 |
| 20140128000002 | n = 5, s = 50, direct transfer | Client 1 to client 5 |
| 20140128000003 | n = 20, s = 12.5, direct transfer | Client 1 to client 20 |
| 20140128000004 | n = 3, s = 50, share and random | Client 1 |
| . . . | . . . | |

Step S1034: The server generates a receiving link including the virtual goods package identifier.

Note that a cache mechanism may also be set on the server. That is, after generating n virtual goods packages based on the virtual goods package parameters, the server may configure in advance the amount of the virtual goods in the virtual goods package based on virtual goods package parameters. Thus, when subsequently performing interactive reception with the recipient client, the server may directly send the configured virtual goods to the recipient client, improving the processing efficiency.

Figure 13:
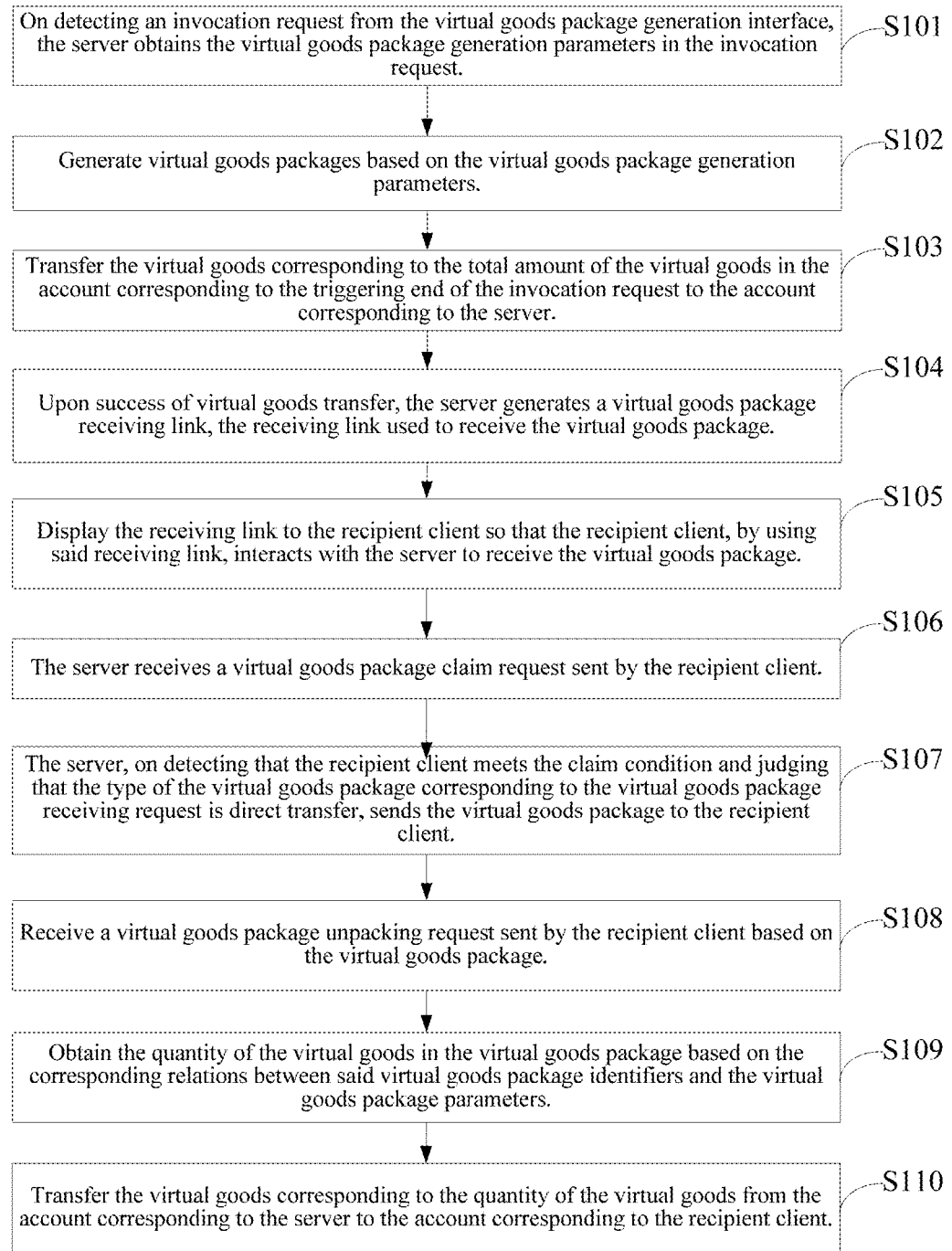
FIG. 13 is the flowchart of embodiments of the method provided by the present disclosure for sending virtual goods.

FIG. 13 shows the third embodiment of the method provided by the present disclosure for sending virtual goods. In this embodiment, after the above-mentioned Step S105, the following steps are further performed:

Step S106: The server receives a virtual goods package claim request sent by the recipient client.

For example, the recipient client obtains the virtual goods package identifier of the virtual goods package in the receiving link and then sends to the server 200 a virtual goods package claim request including the recipient identifier of the recipient client and the virtual goods package identifier of the virtual goods package. In this case, the server 200 receives the virtual goods package claim request sent by the recipient client.

Step S107: The server 200, detecting that the recipient client meets the claim condition and determining that the type of the virtual goods package corresponding to the virtual goods package receiving request is direct transfer, sends the virtual goods package to the recipient client;

On receiving a virtual goods package claim request, the server 200 checks the type of the virtual goods packages corresponding to the virtual goods identifier in the claim request. If the type of the virtual goods packages is direct transfer, the server 200 determines whether the receiving device that sends the virtual goods package claim request meets the claim condition. If the recipient client meets the claim condition, the server 200 sends the virtual goods packages to the recipient client. The claim request includes: the recipient identifier is one of the recipient identifiers corresponding to the recipient clients in the virtual goods package generation parameters, and the remaining quantity of the n virtual goods packages corresponding to the virtual goods package identifiers is not zero; or, the recipient identifier is one of the recipient identifiers corresponding to the recipient clients in the virtual goods package generation parameters, the remaining quantity of the n virtual goods packages corresponding to the virtual goods package identifiers is not zero, and the recipient client has not received the virtual goods packages corresponding to the virtual goods package identifiers.

Wherein, the first claim condition, namely, the recipient identifier is one of the recipient identifiers corresponding to the virtual goods package identifiers, is used for the server to determine whether the recipient client has the authorization to claim the virtual goods package corresponding to the virtual goods package identifier. For example, for example, in the virtual goods package generation parameters of an invocation request, the recipient clients of virtual goods are set to user B, user C, and user D; that is, user B, user C, and user D have the authorization to claim the virtual goods package. In this case, when a user with the authorization initiates a claim request, the server determines that the user meets the claim condition; when a user without the authorization initiates a claim request, the server determines that the user does not meet the claim condition. Therefore, by comparing the recipient identifier carried in the virtual goods package claim request initiated by the user with the recipient identifier corresponding to the recipient client in the virtual goods package generation parameters, the server determines whether the recipient client meets the claim condition.

The second claim condition, namely, the remaining quantity of virtual goods packages is not zero, is programmed to check whether any of the generated virtual goods packages remains. If all the virtual goods packages have been received, the recipient client cannot receive any more of the virtual goods packages.

The third claim condition is optional. The third claim condition, namely, the recipient client has not received the virtual goods package corresponding to the virtual goods package identifier, is programmed to determine whether the recipient client has already received the virtual goods package corresponding to the virtual goods package identifier, thereby avoiding repeated reception, which prevents other recipient clients from receiving virtual goods packages.

Step S108: Receive a virtual goods package unpacking request sent by the recipient client based on the virtual goods package.

The virtual goods package includes virtual goods. Therefore, if the recipient client needs to obtain the virtual goods in the virtual goods package after receiving the virtual goods package, the recipient client needs to send a virtual goods package unpacking request to the server. A virtual goods package unpacking request includes the virtual goods package identifier of the virtual goods package. In this case, the server receives the virtual goods package unpacking request.

Step S109: Obtain the quantity of the virtual goods in the virtual goods package based on the corresponding relations between the virtual goods package identifiers and the virtual goods package parameters;

When the server generates a virtual goods package, the corresponding relation between the virtual goods package identifier and virtual goods package parameters has been stored on the server. Therefore, based on the corresponding relation, the server may obtain the virtual goods package parameters corresponding to the virtual goods package identifier included in the virtual goods package unpacking request and obtain the quantity of the virtual goods in the virtual goods package based on the virtual goods package parameters. For example, assume that the virtual goods package identifier in the virtual goods package unpacking request is 20140128000003. According to Table 1, the virtual goods package parameters corresponding to the virtual goods package identifier are "n=20, s=12.5, direct transfer." Therefore, based on the virtual goods package parameters, the amount of the virtual goods in the virtual goods package is 12.5.

Step S110: Transfer the virtual goods corresponding to the amount of the virtual goods from the account corresponding to the server to the account corresponding to the recipient client.

Figure 14:
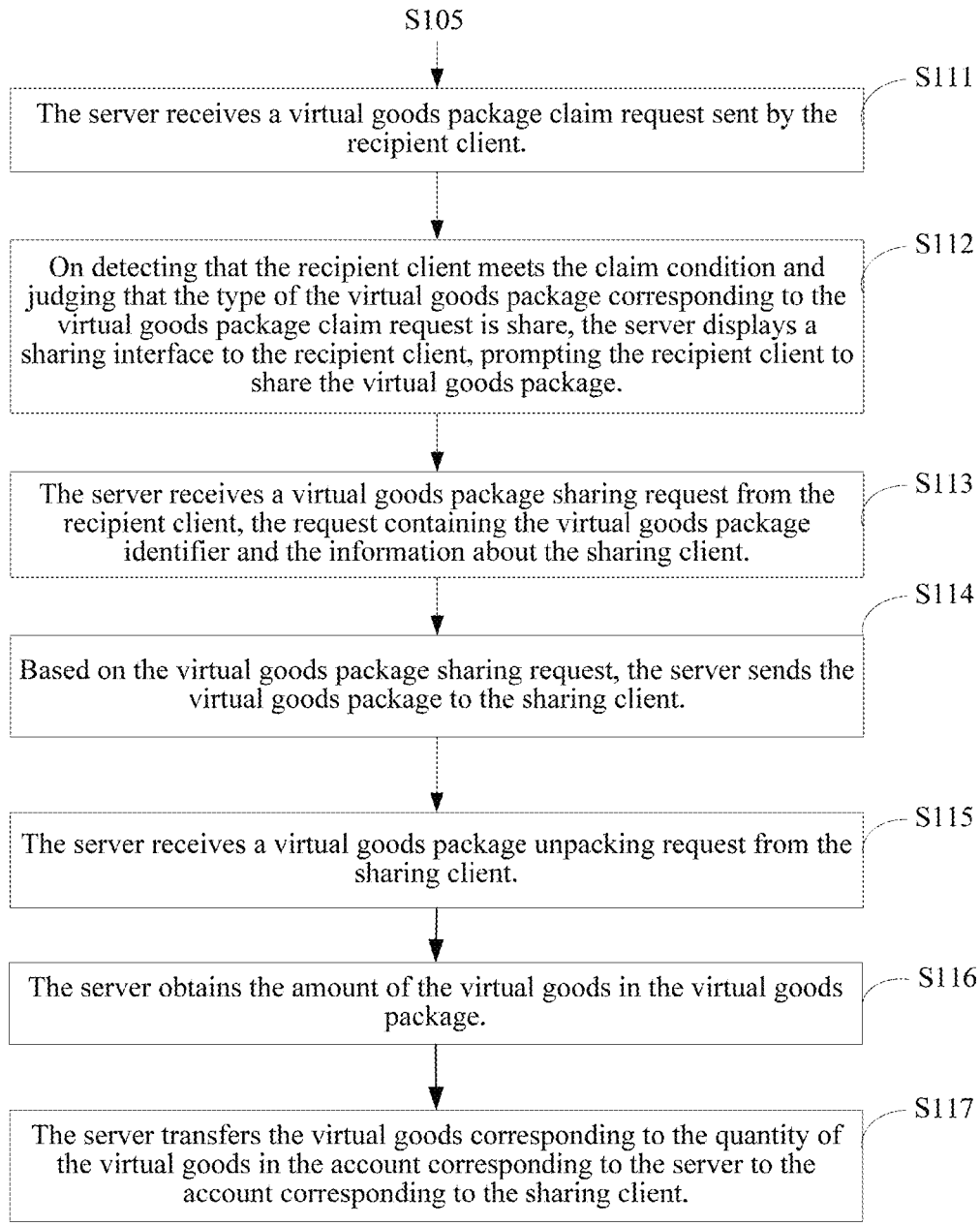
FIG. 14 is the flowchart of embodiments of the method provided by the present disclosure for sending virtual goods.

FIG. 14 shows the fourth embodiment of the method provided by the present disclosure for sending virtual goods. In this embodiment, after the above-mentioned Step S105, the following steps are further performed:

Step S111: The server receives a virtual goods package claim request sent by the recipient client.

For example, the recipient client obtains the virtual goods package identifier of the virtual goods package in the receiving link and then sends to the server a virtual goods package claim request including the recipient identifier of the recipient client and the virtual goods package identifier of the virtual goods package. In this case, the server receives the virtual goods package claim request sent by the recipient client.

Step S112: On detecting that the recipient client meets the claim condition and determining that the type of the virtual goods package corresponding to the virtual goods package claim request is share, the server displays a sharing interface to the recipient client, prompting the recipient client to share the virtual goods package;

On receiving a virtual goods package claim request, the server checks the type of the virtual goods packages corresponding to the virtual goods identifier in the claim request.

If the type of the virtual goods packages is share, the server determines whether the receiving device that sends the virtual goods package claim request meets the claim condition. If the receiving device meets the claim condition, the server displays a sharing interface to the recipient client, prompting the recipient client to share the virtual goods package. The claim condition is the same as the claim condition described in Step S107 and therefore is not described in detail here.

Step S113: The server receives a virtual goods package sharing request from the recipient client, the request including the virtual goods package identifier and the information about the sharing client;

Step S114: Based on the virtual goods package sharing request, the server sends the virtual goods package to the sharing client;

Step S115: The server receives a virtual goods package unpacking request from the sharing client;

The virtual goods package includes virtual goods. Therefore, if the sharing client needs to obtain the virtual goods in the virtual goods package after receiving the virtual goods package, the sharing client needs to send a virtual goods package unpacking request to the server. The virtual goods package unpacking request includes the virtual goods package identifier of the virtual goods package.

Step S116: The server obtains the amount of the virtual goods in the virtual goods package;

When the server generates a virtual goods package, the corresponding relation between the virtual goods package identifier and virtual goods package parameters has been stored on the server. Therefore, based on the corresponding relation, the server may obtain the virtual goods package parameters corresponding to the virtual goods package identifier included in the virtual goods package unpacking request and obtain the quantity of the virtual goods in the virtual goods package based on the virtual goods package parameters. For example, assume that the virtual goods package identifier in the virtual goods package unpacking request is 20140129000001. According to Table 1, the virtual goods package parameters corresponding to the virtual goods package identifier are "n=5, s=150, share and fixed", and the recipient clients are client 1 to client 5. Therefore, based on the virtual goods package parameters and the recipient client information, the amount of the virtual goods in each virtual goods package is RMB 10.

Step S117: The server transfers the virtual goods corresponding to the amount of the virtual goods in the account corresponding to the server to the account corresponding to the sharing client.

Figure 15:
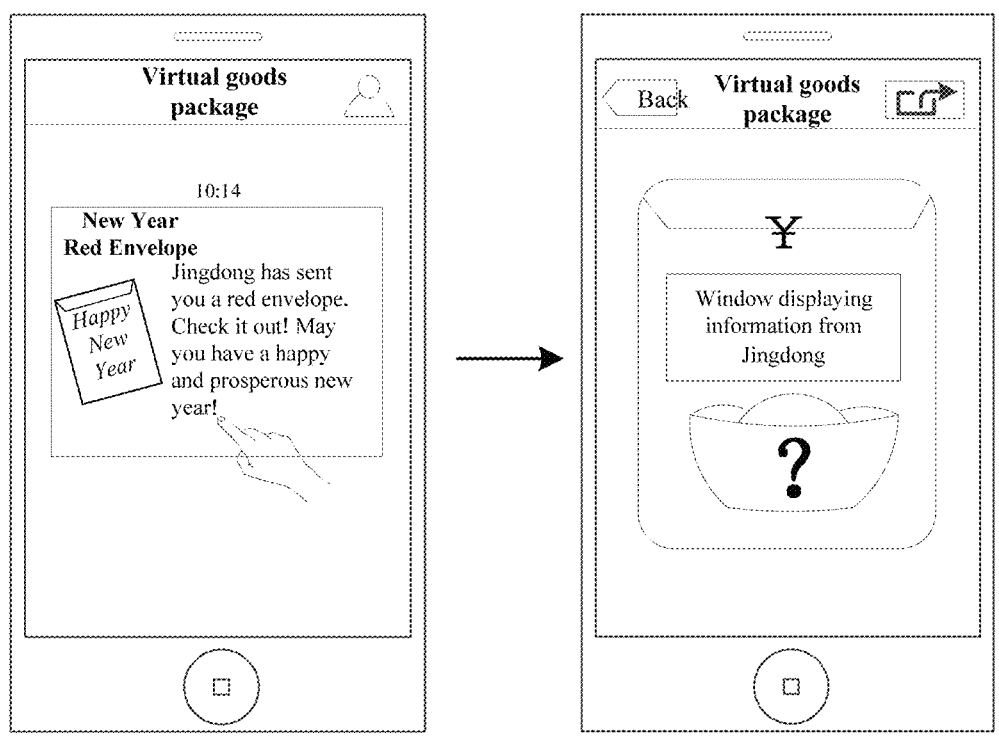
FIG. 15 is a schematic diagram for the procedure in which the server sends the display information on the invoker client while claiming a virtual goods package by using the method provided by the present disclosure for sending virtual goods.

Further, in addition to sending the virtual goods package to the recipient client or sharing client, the server may also send the virtual goods package display information preset on the invoker client for display on the virtual goods package. As shown in FIG. 15, on receiving an invocation request from the virtual goods package generation interface, the server, in addition to generating a virtual goods package based on the invocation request, adds the preset display information to the virtual goods package. Thus, when displaying the virtual goods package to the recipient client or sharing client, the server generates a display window on the virtual goods package displayed on the recipient client or sharing client for displaying the display information preset on the invoker client.

Figure 16:
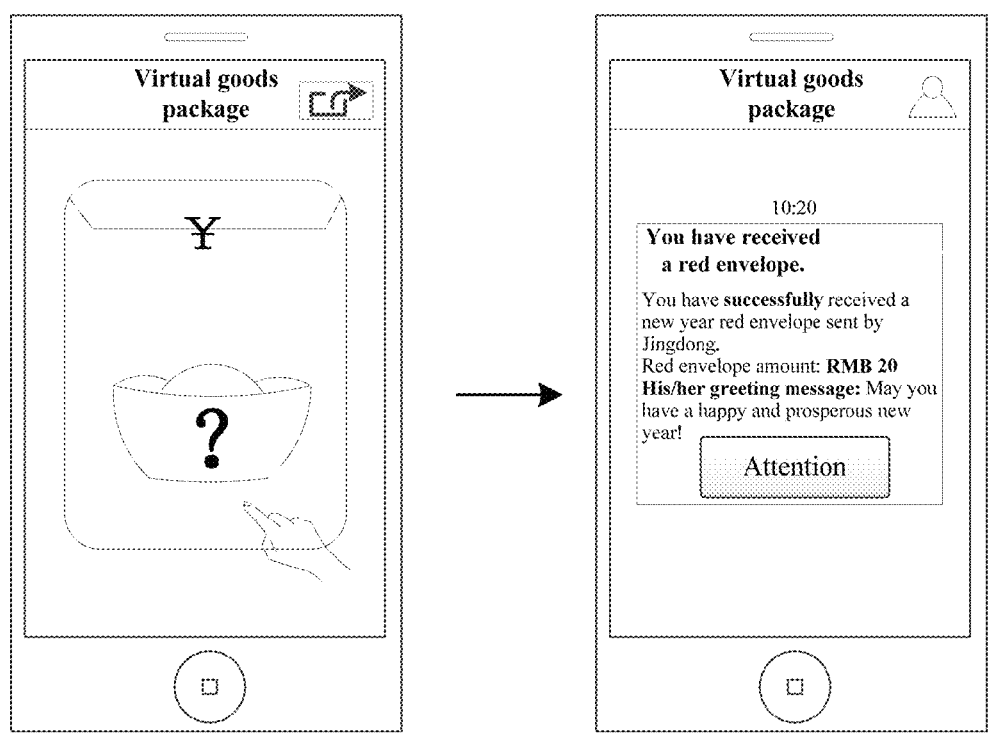
FIG. 16 is a schematic diagram for the procedure in which the server sends the attention link on the invoker client while claiming a virtual goods package by using the method provided by the present disclosure for sending virtual goods.

Further, in addition to sending the virtual goods package to the recipient client or sharing client, the server sends the association link of the invoker client for the recipient client or sharing client to associate with the invoker client. As shown in FIG. 16, on receiving an invocation request from the virtual goods package generation interface, the server, in addition to generating a virtual goods package based on the invocation request, generates an association link so that the server sends the association link along with the virtual goods package. On receiving a virtual goods package unpacking request from the recipient client or sharing client, the server sends the attention link to the recipient client so that the recipient client uses the attention link to associate with the invoker client.

Figure 17:
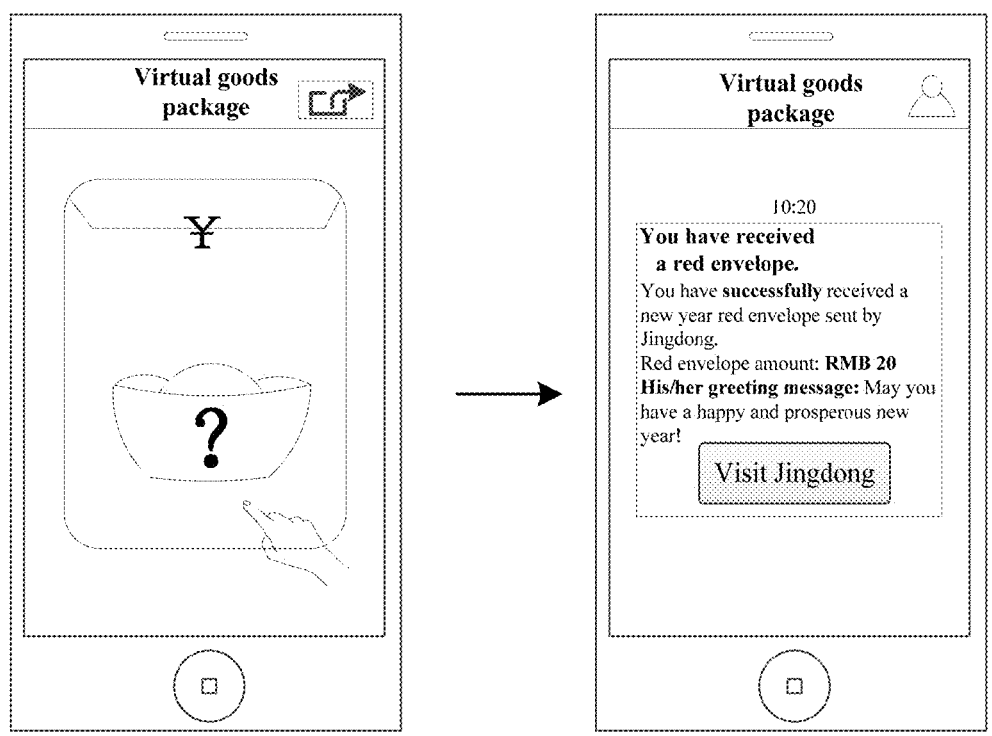
FIG. 17 is a schematic diagram for the procedure in which the server sends the access link on the invoker client while claiming a virtual goods package by using the method provided by the present disclosure for sending virtual goods.

Further, in addition to sending the virtual goods package to the recipient client or sharing client, the server sends the access link of the invoker client for the recipient client or sharing client to access the webpage corresponding to the invoker client. As shown in FIG. 17, on receiving an invocation request from the virtual goods package generation interface, the server, in addition to generating a virtual goods package based on the invocation request, generates an access link so that the server sends the access link along with the virtual goods package. On receiving a virtual goods package unpacking request from the recipient client or sharing client, the server sends the access link to the recipient client so that the recipient client uses the access link to associate with the invoker client.

As shown in FIG. 18, the receiving device 300 may include the processor 31, the storage 32, the user interface 33, the network interface 34, and the communication bus 35. The communication bus 35 is programmed to complete the communication among the components of the server. The user interface 33 may be a wired interface or wireless interface, programmed to connect input/output devices, such as a mouse, keyboard, and monitor, for receiving user-input information and displaying information. The network interface may also be a wired interface or wireless interface, used for the server 200 to communicate with the invoking device 100 and the receiving device 300. The storage 32 may comprise one or more computer-readable storage media. In addition, the storage 22 may be an internal storage or external storage. The storage stores an operating system and a virtual goods receiving application. The processor 31 is programmed to invoke the virtual goods receiving application stored in the storage 32 so that the server receives the virtual goods.

FIG. 19 shows an embodiment of the method provided by the present disclosure for receiving virtual goods. This embodiment is described assuming that the method for receiving virtual goods is used in the implementation environment as shown in FIG. 1 and FIG. 18. The virtual goods receiving method includes the following steps:

Step S401: The recipient client receives a receiving link sent by the server. Based on an invocation request received from the virtual goods package generation interface, the server transfers the virtual goods corresponding to the total amount of the virtual goods in the invocation request from the account corresponding to the invoker client to the account corresponding to the server and, upon success of virtual goods transfer, generates a virtual goods package and the receiving link programmed to receive the virtual goods package.

Step S402: By using the receiving link, the recipient client interacts with the server to receive the virtual goods package.

With the embodiments of the present disclosure, the server 200 provides a virtual goods package generation interface that may be invoked to send virtual goods packages. This simplifies user operations and greatly reduces the time taken for user operations, improving the efficiency of sending virtual goods packages. In addition, data security problems due to improper user operations are avoided.

Figure 20:
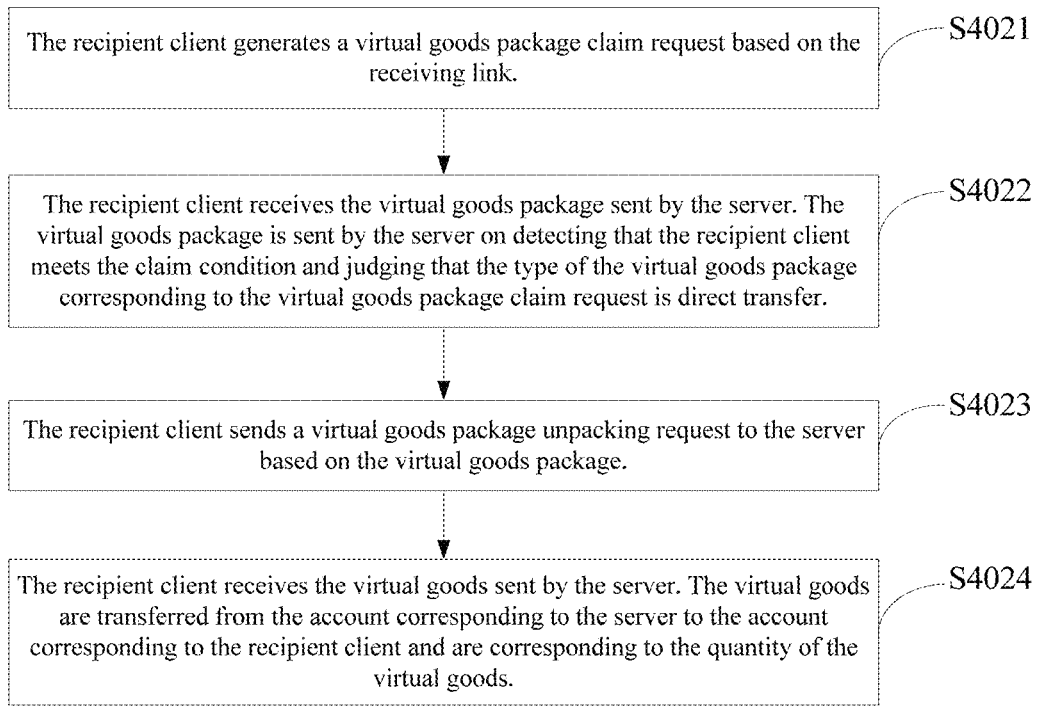
FIG. 20 is the flowchart of embodiments of the detailed procedure in which the recipient client interacts with the server to receive the virtual goods package by using the method provided by the present disclosure for receiving virtual goods.

Further, as shown in FIG. 20, the Step S402 includes:

Step S4021: The recipient client generates a virtual goods package claim request based on the receiving link;

For example, the recipient client obtains the virtual goods package identifier of the virtual goods package in the receiving link and then sends to the server 200 a virtual goods package claim request including the recipient identifier of the recipient client and the virtual goods package identifier of the virtual goods package.

Step S4022: The recipient client sends the virtual goods package claim request to the server. Thus, the server, on detecting that the recipient client meets the claim condition and determining that the type of the virtual goods package corresponding to the virtual goods package claim request is direct transfer, sends the virtual goods package to the recipient client;

On receiving a virtual goods package claim request, the server 200 checks the type of the virtual goods packages corresponding to the virtual goods identifier in the claim request. If the type of the virtual goods packages is direct transfer, the server 200 determines whether the recipient client that sends the virtual goods package claim request meets the claim condition. If the recipient client meets the claim condition, the server 200 sends the virtual goods packages to the recipient client. The recipient client receives a virtual goods package sent by the server 200. The claim condition includes: the recipient identifier is one of the recipient identifiers corresponding to the recipient clients in the virtual goods package generation parameters.

Step S4023: The recipient client receives a virtual goods package sent by the server.

Step S4024: Based on the virtual goods package, the recipient client sends a virtual goods package unpacking request to the server. Thus, based on the virtual goods package unpacking request, the server transfers the virtual goods corresponding to the amount of the virtual goods from the account corresponding to the server to the account corresponding to the recipient client.

The virtual goods package includes virtual goods. Therefore, if the recipient client needs to obtain the virtual goods in the virtual goods package after receiving the virtual goods package, the recipient client needs to send a virtual goods package unpacking request to the server. A virtual goods package unpacking request includes the virtual goods package identifier of the virtual goods package.

When the server generates a virtual goods package, the corresponding relation between the virtual goods package identifier and virtual goods package parameters has been stored on the server. Therefore, based on the corresponding relation, the server may obtain the virtual goods package parameters corresponding to the virtual goods package identifier included in the virtual goods package unpacking request and obtain the quantity of the virtual goods in the virtual goods package based on the virtual goods package parameters. Then, the server transfers the virtual goods corresponding to the amount of the virtual goods in the account corresponding to the server to the account corresponding to the recipient client.

Figure 21:
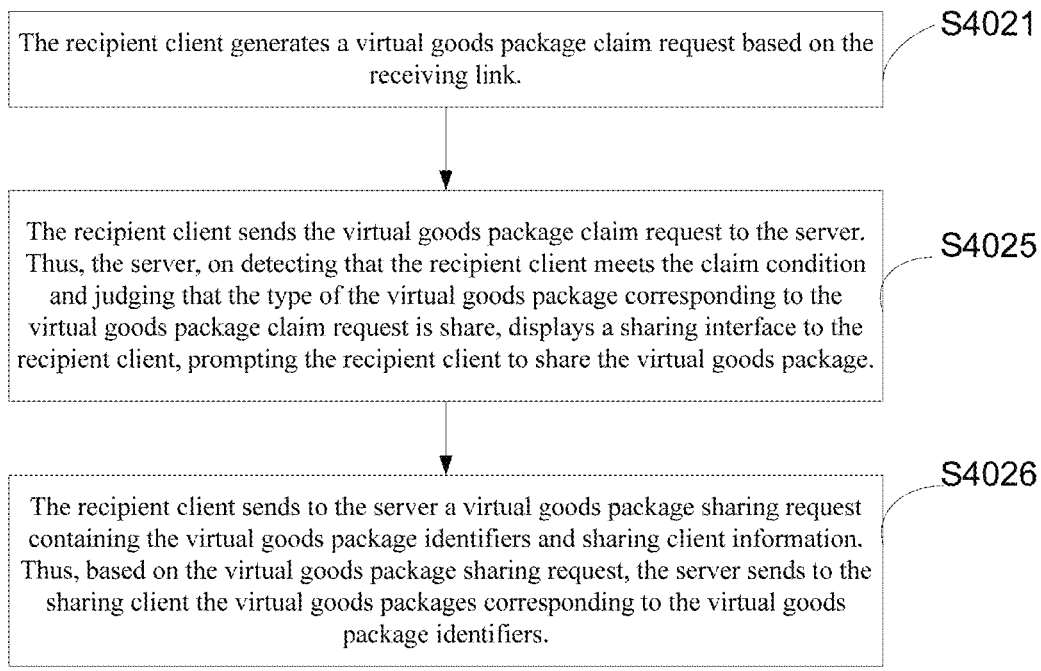
FIG. 21 is the flowchart of embodiments of the detailed procedure in which the recipient client interacts with the server to receive the virtual goods package by using the method provided by the present disclosure for receiving virtual goods.

Further, as shown in FIG. 21, after the Step S4021, the following steps are further performed:

Step S4025: The recipient client sends the virtual goods package claim request to the server. Thus, the server, on detecting that the recipient client meets the claim condition and determining that the type of the virtual goods package corresponding to the virtual goods package claim request is share, displays a sharing interface to the recipient client, prompting the recipient client to share the virtual goods package;

Based on the virtual goods package sent by the server, the recipient client sends a virtual goods package claim request to the server. On receiving a virtual goods package claim request, the server checks the type of the virtual goods packages corresponding to the virtual goods identifier in the claim request. If the type of the virtual goods packages is share, the server determines whether the receiving device that sends the virtual goods package claim request meets the claim condition. If the receiving device meets the claim condition, the server displays a sharing interface to the recipient client, prompting the recipient client to share the virtual goods package. The claim condition includes: the recipient identifier is one of the recipient identifiers corresponding to the recipient client in the virtual goods package generation parameters, and the remaining quantity of the virtual goods package is not zero; or, the recipient identifier is one of the recipient identifiers corresponding to the recipient client in the virtual goods package generation parameters, the remaining quantity of the virtual goods package is not zero, and the recipient client has not received the virtual goods package.

Step S4026: Based on the sharing interface, the recipient client sends to the server a virtual goods package sharing request including the virtual goods package identifier and sharing client information. Thus, based on the virtual goods package sharing request, the server sends to the sharing client the virtual goods packages corresponding to the virtual goods package identifiers.

The virtual goods package includes virtual goods. Therefore, if the recipient client needs to obtain the virtual goods in the virtual goods package after receiving the virtual goods package, the recipient client needs to send a virtual goods package sharing request to the server. Based on the virtual goods package sharing request, the server sends to the sharing client the virtual goods package corresponding to the virtual goods package identifier. To obtain the virtual goods in the received virtual goods package, the sharing client needs to send a virtual goods package unpacking request to the server. The virtual goods package unpacking request includes the virtual goods package identifier of the virtual goods package. Based on the corresponding relations between the virtual goods identifiers and virtual goods package parameters, the server obtains the virtual goods package parameters corresponding to the virtual goods package identifier included in the virtual goods package unpacking request and obtains the amount of the virtual goods in the virtual goods package based on the virtual goods package parameters. Then, the server transfers the virtual goods corresponding to the amount of the virtual goods in the account corresponding to the server to the account corresponding to the sharing client.

Further, after the recipient client interacts with the server by using the receiving link to receive the virtual goods package, the following steps are performed:

The recipient client receives the preset virtual goods package display information sent by the server for display on the virtual goods package. As shown in FIG. 15, on receiving an invocation request from the virtual goods package generation interface, the server, in addition to generating a virtual goods package based on the invocation request, adds the preset display information to the virtual goods package. Thus, when displaying the virtual goods package to the recipient client or sharing client, the server generates a display window on the virtual goods package displayed on the recipient client or sharing client for displaying the display information preset on the invoker client.

Further, after the recipient client interacts with the server by using the receiving link to receive the virtual goods package, the following steps are performed:

The recipient client receives the link for associating with the invoker client sent by the server so that the recipient client is associated with the invoker client. As shown in FIG. 16, on receiving an invocation request from the virtual goods package generation interface, the server, in addition to generating a virtual goods package based on the invocation request, generates an association link so that the server sends the association link along with the virtual goods package. On receiving a virtual goods package unpacking request from the recipient client or sharing client, the server sends the attention link to the recipient client so that the recipient client uses the attention link to associate with the invoker client.

Further, after the recipient client interacts with the server by using the receiving link to receive the virtual goods package, the following steps may be performed:

The recipient client receives the link for accessing the invoker client sent by the server so that the recipient client accesses the invoker client. As shown in FIG. 17, on receiving an invocation request from the virtual goods package generation interface, the server, in addition to generating a virtual goods package based on the invocation request, generates an access link so that the server sends the access link along with the virtual goods package. On receiving a virtual goods package unpacking request from the recipient client or sharing client, the server sends the access link to the recipient client so that the recipient client uses the access link to associate with the invoker client.

Figure 22:
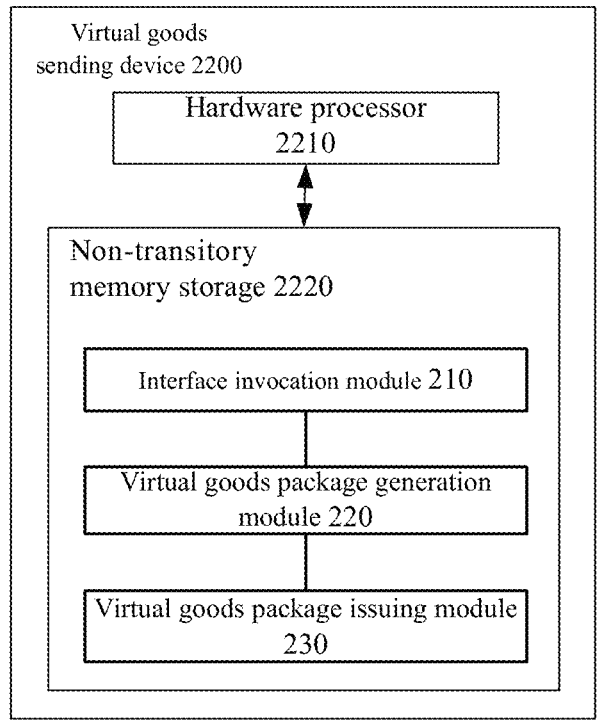
FIG. 22 is a schematic diagram for the function modules of the device provided by the present disclosure for sending virtual goods.

For the above-mentioned method for sending virtual goods, the present disclosure further provides a virtual goods sending device. As shown in FIG. 22, the virtual goods sending device 2200 includes a hardware processor 2210 and a non-transitory storage medium 2220 that is configured to store modules including:

the interface invocation module 210, used for the server, on detecting an invocation request from the virtual goods package generation interface, to obtain the virtual goods package generation parameters included in the invocation request; the virtual goods package generation parameters include the type of the virtual goods package, the quantity of virtual goods packages, total amount of the virtual goods, and the recipient client that receives the virtual goods;

the virtual goods package generation module 220, programmed to transfer the virtual goods corresponding to the total quantity of the virtual goods in the account corresponding to the invoker client to the account corresponding to the server; the virtual goods package generation module, used for the server, upon success of virtual goods transfer, to generate a virtual goods package and a link for receiving the virtual goods package based on the virtual goods package generation parameters;

the virtual goods package distribution module 230, programmed to send the receiving link to the recipient client so that the recipient client interacts with the server to receive the virtual goods package by using the receiving link.

Figure 23:
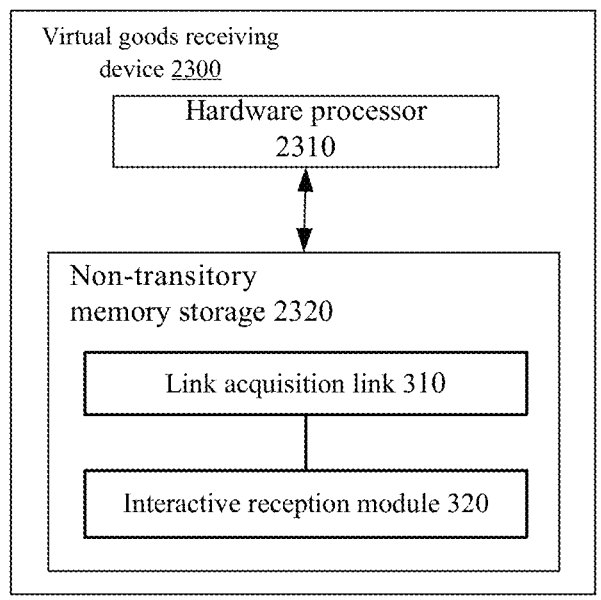
FIG. 23 is a schematic diagram for the function modules of the device provided by the present disclosure for receiving virtual goods.

For the above-mentioned method for receiving virtual goods, the present disclosure further provides a virtual goods receiving device. As shown in FIG. 23, the virtual goods receiving device includes:

the link acquisition module 310, programmed to receive a receiving link sent by the server. Based on an invocation request received from the virtual goods package generation interface, the server transfers the virtual goods corresponding to the total amount of the virtual goods in the account corresponding to the invoker client to the account corresponding to the server and, upon success of virtual goods transfer, generate a virtual goods package and the receiving link programmed to receive the virtual goods package;

the interactive reception module 320, programmed to interact with the server to receive the virtual goods package by using the receiving link.

Figure 24:
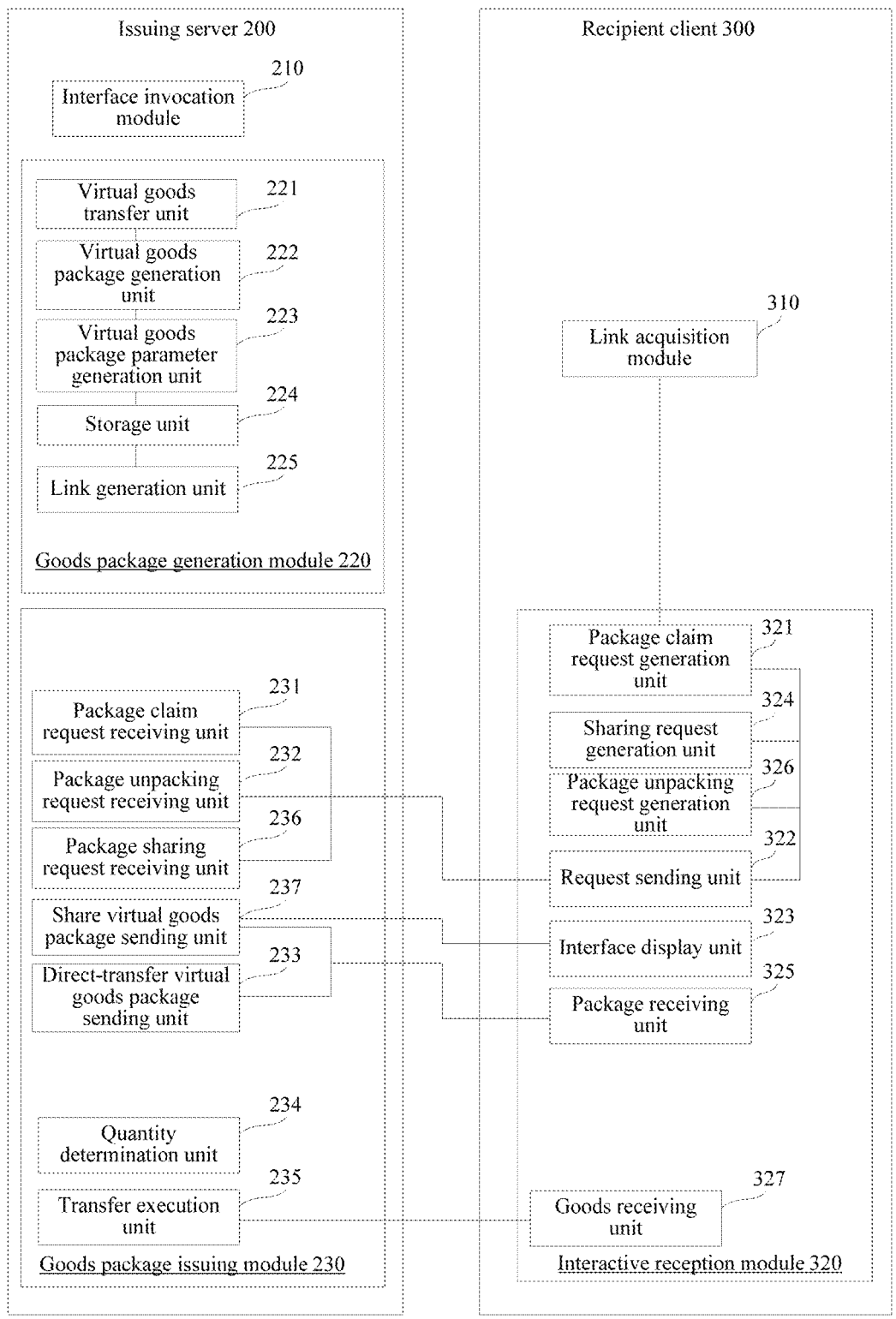
FIG. 24 is a schematic diagram for the function modules of the virtual goods receiving and sending system provided by the present disclosure.

FIG. 24 shows a structural diagram for the virtual goods receiving and sending system provided by an embodiment of the present disclosure. The virtual goods receiving and sending system includes a recipient client in a social networking application client and a server connected to the recipient client by using a wired network or wireless network.

The server may comprise a virtual goods sending device. The virtual goods sending device may be implemented as part or all of the server by software, hardware, or a combination of software and hardware. The virtual goods sending device includes the interface invocation module 210, the virtual goods package generation module 220, and the virtual goods package distribution module 230, wherein:

the interface invocation module 210 is programmed to, on detecting an invocation request from the virtual goods package generation interface, obtain the virtual goods package generation parameters included in the invocation request; the virtual goods package generation parameters include the type of the virtual goods package, the quantity of virtual goods packages, total amount of the virtual goods, and the recipient client that receives the virtual goods.

Further, the interface invocation module 210 is further programmed to check whether the recipient client meets the preset triggering condition on the invoker client and, if the recipient client meets the triggering condition, based on the preset generation rules on the invoker client, generate an invocation request including the virtual goods package generation parameters for invoking the virtual goods package generation interface; the preset generation rules comprise the total amount of the virtual goods corresponding to the triggering condition, quantity of the virtual goods packages, and type of the virtual goods packages.

The triggering condition includes: in the current virtual goods transfer, the quantity of the virtual goods in the account corresponding to the recipient client that are successfully transferred to the account corresponding to the invoker client reaches a first preset threshold; or, within a preset period of time, the accumulative quantity of the virtual goods in the account corresponding to the recipient client that are successfully transferred to the account corresponding to the invoker client reaches a second preset threshold.

The preset condition includes triggering conditions at multiple levels, and the corresponding the generation rules apply when triggering conditions at multiple levels are met.

the virtual goods package generation module 220, programmed to transfer the virtual goods corresponding to the total amount of the virtual goods in the account corresponding to the invoker client to the account corresponding to the server; the virtual goods package generation module, used for the server, upon success of virtual goods transfer, to generate a virtual goods package and a link for receiving the virtual goods package based on the virtual goods package generation parameters.

For example, the virtual goods package generation module 220 includes the virtual goods transfer unit 221, the virtual goods package generation unit 222, the virtual goods package parameter generation unit 223, the storage unit 224, and the link generation unit 225, wherein:

The virtual goods transfer unit 221 is programmed to transfer the virtual goods corresponding to the total quantity of the virtual goods in the account corresponding to the invoker client to the account corresponding to the server;

The virtual goods package generation unit 222 is programmed to generate a virtual goods package based on the virtual goods package generation parameters;

The virtual goods package parameter generation unit 223 is programmed to generate the virtual goods package identifiers and virtual goods package parameters corresponding to the virtual goods packages, the virtual goods package parameters including the quantity of the virtual goods packages, total amount of the virtual goods, and the type of the virtual goods packages;

The storage unit 224 is programmed to store the corresponding relations between the virtual goods package identifiers and the virtual goods package generation parameters and the identifier of the recipient client;

The link generation unit 225 is programmed to generate a receiving link including the virtual goods package identifier.

Further, the virtual goods package generation module 230 includes the package claim request receiving unit 231, the package unpacking request receiving unit 232, the direct virtual goods package sending unit 233, the quantity determination unit 234, and the transfer execution unit 235, wherein:

The package claim request receiving unit 231 is programmed to receive a virtual goods package claim request sent by the recipient client, the virtual goods package claim request including the recipient identifier of the recipient client and the virtual goods package identifier of the virtual goods package;

The package unpacking request receiving unit 232 is programmed to receive a virtual goods package unpacking request sent by the recipient client based on the virtual goods package, the virtual goods package unpacking request including the virtual goods package identifier of the virtual goods package;

The direct-transfer virtual goods package sending unit 233 is programmed to, on detecting that the recipient client meets the claim condition and determining that the type of the virtual goods package corresponding to the virtual goods package receiving request is direct transfer, send the virtual goods package to the recipient client; the claim condition includes: the recipient identifier is one of the recipient identifiers corresponding to the recipient client in the virtual goods package generation parameters, and the remaining quantity of the virtual goods package is not zero; or, the recipient identifier is one of the recipient identifiers corresponding to the recipient client in the virtual goods package generation parameters, the remaining quantity of the virtual goods package is not zero, and the recipient client has not received the virtual goods package;

The quantity determination unit 234 is programmed to obtain the quantity of the virtual goods in the virtual goods package based on the corresponding relations between the virtual goods package identifiers and the virtual goods package parameters;

The transfer execution unit 235 is programmed to transfer the virtual goods corresponding to the quantity of the virtual goods from the account corresponding to the server to the account corresponding to the recipient client.

Further, the virtual goods package distribution module 230 includes the package sharing request receiving unit 236 and the share virtual goods package distribution unit 237, wherein:

The package sharing request receiving unit 236 is programmed to receive a virtual goods package sharing request from the recipient client, the request including the virtual goods package identifier and sharing client information;

The package unpacking request receiving unit 232 is programmed to receive a virtual goods package unpacking request sent by the sharing client;

The share virtual goods package distribution unit 237 is programmed to, on detecting that the recipient client meets the claim condition and determining that the type of the virtual goods package corresponding to the virtual goods package claim request is share, display a sharing interface to the recipient client, prompting the recipient client to share the virtual goods package; the claim condition includes: the recipient identifier is one of the recipient identifiers corresponding to the recipient client in the virtual goods package generation parameters, and the remaining quantity of the virtual goods package is not zero; or, the recipient identifier is one of the recipient identifiers corresponding to the recipient client in the virtual goods package generation parameters, the remaining quantity of the virtual goods package is not zero, and the recipient client has not received the virtual goods package; this unit is further programmed to send a virtual goods package to the sharing client based on the virtual goods package sharing request;

The quantity determination unit 234 is programmed to obtain the quantity of the virtual goods in the virtual goods package based on the virtual goods package unpacking request;

The transfer execution unit 235 is programmed to transfer the virtual goods corresponding to the quantity of the virtual goods in the account corresponding to the server to the account corresponding to the sharing client.

Further, the virtual goods package distribution module 230 includes the display information sending unit 238, the association link sending unit 239, and the access link sending unit 240, wherein:

The display information sending unit 238 is programmed to send the virtual goods package display information preset on the invoker client to the server; and/or, the association link sending unit 239 is programmed to send a link for associating with the invoker client so that the recipient client or sharing client is associated with the invoker client; and/or, the access link sending unit 240 is programmed to send a link for accessing the invoker client so that the recipient client or sharing client accesses the webpage corresponding to the invoker client.

The recipient client may comprise a virtual goods receiving device. The virtual goods receiving device may be implemented as part or all of the recipient client by software, hardware, or a combination of software and hardware. The virtual goods receiving device includes the link acquisition module 310 and the interactive reception module 320, wherein:

the link acquisition module 310 is programmed to receive a receiving link sent by the server. Based on an invocation request received from the virtual goods package generation interface, the server transfers the virtual goods corresponding to the total amount of the virtual goods in the account corresponding to the invoker client to the account corresponding to the server and, upon success of virtual goods transfer, generate a virtual goods package and the receiving link programmed to receive the virtual goods package;

the interaction receiving module 320 is programmed to, by using the receiving link, interact with the server to receive the virtual goods package.

For example, the interactive reception module 320 includes the package claim request generation unit 321, the request sending unit 322, the interface display unit 323, and the sharing request generation unit 324.

The package claim request generation unit 321 is programmed to generate a virtual goods package claim request based on the receiving link, the virtual goods package claim request including the recipient identifier of the recipient client and the virtual goods package identifier of the virtual goods package;

The request sending unit 322 is programmed to send the virtual goods package claim request to the server so that, on detecting that the recipient client meets the claim condition and determining that the type of the virtual goods package corresponding to the virtual goods package claim request is share, the server displays a sharing interface to the recipient client, prompting the recipient client to share the virtual goods package; the claim condition includes: the recipient identifier is one of the recipient identifiers corresponding to the recipient client in the virtual goods package generation parameters, and the remaining quantity of the virtual goods package is not zero; or, the recipient identifier is one of the recipient identifiers corresponding to the recipient client in the virtual goods package generation parameters, the remaining quantity of the virtual goods package is not zero, and the recipient client has not received the virtual goods package; this unit is further programmed to send the virtual goods package sharing request to the server so that the server sends the virtual goods package to the sharing client based on the virtual goods package sharing request;

The interface display unit 323 is programmed to display the sharing interface sent by the server;

The sharing request generation unit 324 is programmed to, based on the sharing interface, generate a virtual goods package sharing request including the virtual goods package identifier and sharing client information.

Further, the virtual goods receiving device includes the package receiving unit 325.

The request sending unit 322 is programmed to send the virtual goods package claim request to the server so that, on detecting that the recipient client meets the claim condition and determining that the type of the virtual goods package corresponding to the virtual goods package claim request is direct transfer, the server sends the virtual goods package to the recipient client;

The package receiving unit 325 is programmed to receive the virtual goods packages sent by the server.

Further, the virtual goods receiving device includes the package unpacking request generation unit 326 and the goods receiving unit 327.

The package unpacking request generation unit 326 is programmed to, based on the virtual goods package, generate a virtual goods package unpacking request and send the request to the server by using the request sending unit so that the server, based on the virtual goods package unpacking request, transfers the virtual goods corresponding to the quantity of the virtual goods from the account corresponding to the server to the account corresponding to the recipient client;

The goods receiving unit 327 is programmed to receive the virtual goods transferred from the account corresponding to the server to the account corresponding to the recipient client.

While the present disclosure has been particularly disclosed and described above with reference to preferred embodiments, it should be understood that the description is not intended to limit the present disclosure. Any modifications, equivalent substitutions, and improvements made without departing from the spirit or principle of the present disclosure shall fall within the scope of the present disclosure.

The invention claimed is:

1. A method for receiving virtual goods, comprising:
   receiving, by a recipient client device, a receiving link from a server, the receiving link previously generated by the server in response to an invocation request received by the server from an invoker device that is different from the recipient client device after a total amount of the virtual goods in an invoker account corresponding to the invoker device is successfully transferred to a server account corresponding to the server, wherein the receiving link comprises instructions configured to cause the recipient client device to request a virtual goods package from the server;
   detecting the link is triggered;
   requesting, from the server, in response to link being triggered, the virtual goods package; and
   accepting, by the recipient client device, the virtual goods package by interacting with the server via the receiving link.

2. The method according to claim 1, wherein accepting the virtual goods package comprises:
   generating, by the recipient client device, based on the receiving link, a virtual goods package claim request, the virtual goods package claim request comprising a recipient identifier of the recipient client device and a virtual goods package identifier of the virtual goods package;
   sending, by the recipient client device, the virtual goods package claim request to the server such that when the server detects that the recipient client device satisfies a claim condition and determines that a type of the virtual goods package corresponding to the virtual goods package claim request is share, the server sends a sharing interface to the recipient client device and prompts the recipient client device to share the virtual goods package,
      wherein the claim condition comprises a first condition where the recipient identifier is one of the recipient identifiers corresponding to recipient client devices identified in virtual goods package generation parameters, and a remaining amount of the virtual goods packages is not zero, or a second condition where the recipient identifier is one of the recipient identifiers corresponding to the recipient client devices in virtual goods package generation parameters, a remaining amount of the virtual goods packages is not zero, and the recipient client device has not received the virtual goods package; and
   sending, by the recipient client device to the server, based on the sharing interface, a virtual goods package sharing request comprising the virtual goods package identifiers and sharing client information, such that the server sends to a sharing client device the virtual goods packages corresponding to the virtual goods package identifiers based on the virtual goods package sharing request.

3. The method according to claim 1, wherein accepting the virtual goods package comprises:
   generating, by the recipient client device, based on the receiving link, a virtual goods package claim request, the virtual goods package claim request comprising a recipient identifier of the recipient client device and a virtual goods package identifier of the virtual goods package; and
   sending, by the recipient client device, the virtual goods package claim request to the server such that when the server detects that the recipient client device satisfies a claim condition and determines that a type of the virtual goods package corresponding to the virtual goods package claim request is direct transfer, the server sends the virtual goods package to the recipient client device,
      wherein the claim condition comprises a first claim condition where the recipient identifier is one of the recipient identifiers corresponding to the recipient client devices in virtual goods package generation parameters, and a remaining amount of the virtual goods packages is not zero, or a second claim condition where the recipient identifier is one of the recipient identifiers corresponding to the recipient client devices in the virtual goods package generation parameters, the remaining amount of the virtual goods packages is not zero, and the recipient client device has not received the virtual goods package.

4. The method according to claim 3, wherein after sending the virtual goods package claim request to the server, the method further comprises:
   sending, by the recipient client device, based on the virtual goods package, a virtual goods package unpacking request to the server such that the server transfers the virtual goods corresponding to the server account corresponding to the server to a client account corresponding to the recipient client device based on the virtual goods package unpacking request.

5. The method according to claim 1, further comprising at least one of the following:
   receiving, by the client device, preset virtual goods package display information sent by the server for display on the virtual goods package, the preset virtual goods package display information comprising a link configured to cause the client device to access a web page served by the invoker device.

6. The method according to claim 1, wherein accepting the virtual goods package comprises:
   generating, by the recipient client device, based on the receiving link, a virtual goods package claim request, the virtual goods package claim request comprising a recipient identifier of the recipient client device and a virtual goods package identifier of the virtual goods package;
   sending, by the recipient client device, the virtual goods package claim request to the server, wherein the virtual goods package claim request causes the server to detect that the recipient client device satisfies a claim condition and determine that a type of the virtual goods package corresponding to the virtual goods package claim request is share;
   receiving, from the server, a sharing interface, the sharing interface comprising an instruction to share the virtual goods package with a sharing client device;
   sending, by the recipient client device to the server, based on the sharing interface, a virtual goods package sharing request comprising the virtual goods package identifiers and sharing client information, wherein the server sends the virtual goods package to the sharing client device based on the instruction.

7. The method of claim 6, wherein the instruction further causes the server to send the virtual goods package to the sharing client device in response to satisfaction of a claim condition, wherein satisfaction of the claim condition comprises at least one of:
   a first claim condition where the recipient identifier is one of the recipient identifiers corresponding to the recipient client devices in virtual goods package generation parameters, and a remaining amount of the virtual goods packages is not zero, or
   a second claim condition where the recipient identifier is one of the recipient identifiers corresponding to the recipient client devices in the virtual goods package generation parameters, the remaining amount of the virtual goods packages is not zero, and the recipient client device has not received the virtual goods package.

8. A client device comprising:
   a processor, wherein the processor is configured to:
   receive a receiving link from a server, the receiving link previously generated by the server in response to an invocation request received by the server from an invoker device that is different from the client device after a total amount of virtual goods in an invoker account corresponding to the invoker device is successfully transferred to a server account corresponding to the server, wherein the receiving link comprises instructions configured to cause the processor to request a virtual goods package from the server;
   detect the link is triggered;
   request in response to link being triggered, the virtual goods package; and
   accept the virtual goods package by interacting with the server via the receiving link.

9. The client device of claim 8, wherein to accept the virtual goods package, the processor is further configured to:
   generate based on the receiving link, a virtual goods package claim request, the virtual goods package claim request comprising a recipient identifier of the client device and a virtual goods package identifier of the virtual goods package;
   send the virtual goods package claim request to the server such that when the server detects that the client device satisfies a claim condition and determines that a type of the virtual goods package corresponding to the virtual goods package claim request is share, the server sends a sharing interface to the client device and prompts the client device to share the virtual goods package,
      wherein the claim condition comprises a first condition where the recipient identifier is one of the recipient identifiers corresponding to client devices identified in virtual goods package generation parameters, and a remaining amount of the virtual goods packages is not zero, or a second condition where the recipient identifier is one of the recipient identifiers corresponding to the client devices in virtual goods package generation parameters, a remaining amount of the virtual goods packages is not zero, and the client device has not received the virtual goods package; and send based on the sharing interface, a virtual goods package sharing request comprising the virtual goods package identifiers and sharing client information, such that the server sends to a sharing client device the virtual goods packages corresponding to the virtual goods package identifiers based on the virtual goods package sharing request.

10. The client device of claim 8, wherein to accept the virtual goods package, the processor is further configured to:
  generate based on the receiving link, a virtual goods package claim request, the virtual goods package claim request comprising a recipient identifier of the client device and a virtual goods package identifier of the virtual goods package; and
  send the virtual goods package claim request to the server such that when the server detects that the client device satisfies a claim condition and determines that a type of the virtual goods package corresponding to the virtual goods package claim request is direct transfer, the server sends the virtual goods package to the client device,
    wherein the claim condition comprises a first claim condition where the recipient identifier is one of the recipient identifiers corresponding to recipient client devices identified in virtual goods package generation parameters, and a remaining amount of the virtual goods packages is not zero, or a second claim condition where the recipient identifier is one of the recipient identifiers corresponding to the recipient client devices identified in the virtual goods package generation parameters, the remaining amount of the virtual goods packages is not zero, and the client device has not received the virtual goods package.

11. The client device of claim 10, wherein the processor is further configured to:
  send based on the virtual goods package, a virtual goods package unpacking request to the server such that the server transfers the virtual goods corresponding to the server account corresponding to the server to a client account corresponding to the client device based on the virtual goods package unpacking request.

12. The client device of claim 8, wherein the processor is further configured to
  receive preset virtual goods package display information sent by the server for display on the virtual goods package, the preset virtual goods package display information comprising a link configured to cause the client device to access a web page served by the invoker device.

13. The client device of claim 8, wherein to accept the virtual goods package, the processor is further configured to:
  generate based on the receiving link, a virtual goods package claim request, the virtual goods package claim request comprising a recipient identifier of the client device and a virtual goods package identifier of the virtual goods package;
  send the virtual goods package claim request to the server, wherein the virtual goods package claim request causes the server to detect that the client device satisfies a claim condition and determine that a type of the virtual goods package corresponding to the virtual goods package claim request is share;
  receive a sharing interface, the sharing interface comprising an instruction to share the virtual goods package with a sharing client device;
  send based on the sharing interface, a virtual goods package sharing request comprising the virtual goods package identifiers and sharing client information, wherein the server sends the virtual goods package to the sharing client device based on the instruction.

14. The client device of claim 13, wherein the instruction further causes the server to send the virtual goods package to the sharing client device in response to satisfaction of a claim condition, wherein satisfaction of the claim condition comprises at least one of:
  a first claim condition where the recipient identifier is one of the recipient identifiers corresponding to the recipient client devices identified in virtual goods package generation parameters, and a remaining amount of the virtual goods packages is not zero, or
  a second claim condition where the recipient identifier is one of the recipient identifiers corresponding to the recipient client devices identified in the virtual goods package generation parameters, the remaining amount of the virtual goods packages is not zero, and the client device has not received the virtual goods package.

15. A non-transitory computer readable storage medium comprising:
  a plurality of instructions executable by a processor to:
    receive a receiving link from a server, the receiving link previously generated by the server in response to an invocation request received by the server from an invoker device that is different from a client device after a total amount of virtual goods in an invoker account corresponding to the invoker device is successfully transferred to a server account corresponding to the server, wherein the receiving link comprises instructions configured to cause the processor to request a virtual goods package from the server;
    detect the link is triggered;
    request in response to link being triggered, the virtual goods package; and
    accept the virtual goods package by interacting with the server via the receiving link.

16. The non-transitory computer readable storage medium of claim 15, to accept the virtual goods package, the instructions further cause the processor to:
  generate based on the receiving link, a virtual goods package claim request, the virtual goods package claim request comprising a recipient identifier of the client device and a virtual goods package identifier of the virtual goods package;
  send the virtual goods package claim request to the server such that when the server detects that the client device satisfies the claim condition and determines that a type of the virtual goods package corresponding to the virtual goods package claim request is share, the server sends a sharing interface to the client device and prompts the client device to share the virtual goods package,
    wherein the claim condition comprises a first condition where the recipient identifier is one of the recipient identifiers corresponding to client devices identified in virtual goods package generation parameters, and a remaining amount of the virtual goods packages is not zero, or a second condition where the recipient identifier is one of the recipient identifiers corresponding to the client devices in virtual goods package generation parameters, a remaining amount of the virtual goods packages is not zero, and the client device has not received the virtual goods package; and
  send based on the sharing interface, a virtual goods package sharing request comprising the virtual goods package identifiers and sharing client information, such that the server sends to a sharing client device the virtual goods packages corresponding to the virtual goods package identifiers based on the virtual goods package sharing request.

17. The non-transitory computer readable storage medium of claim 15, wherein to accept the virtual goods package, the instructions further cause the processor to:
  generate based on the receiving link, a virtual goods package claim request, the virtual goods package claim request comprising a recipient identifier of the client device and a virtual goods package identifier of the virtual goods package; and
  send the virtual goods package claim request to the server such that when the server detects that the client device satisfies a claim condition and determines that a type of the virtual goods package corresponding to the virtual goods package claim request is direct transfer, the server sends the virtual goods package to the client device,
    wherein the claim condition comprises a first claim condition where the recipient identifier is one of the recipient identifiers corresponding to recipient client devices identified in virtual goods package generation parameters, and a remaining amount of the virtual goods packages is not zero, or a second claim condition where the recipient identifier is one of the recipient identifiers corresponding to the recipient client devices identified in the virtual goods package generation parameters, the remaining amount of the virtual goods packages is not zero, and the client device has not received the virtual goods package.

18. The non-transitory computer readable storage medium of claim 17, wherein the instructions further cause the processor to
  send based on the virtual goods package, a virtual goods package unpacking request to the server such that the server transfers the virtual goods corresponding to the server account corresponding to the server to a client account corresponding to the client device based on the virtual goods package unpacking request.

19. The non-transitory computer readable storage medium of claim 15, wherein the instructions further cause the processor to
  receive preset virtual goods package display information sent by the server for display on the virtual goods package, the preset virtual goods package display information comprising a link configured to cause the client device to access a web page served by the invoker device.

20. The non-transitory computer readable storage medium of claim 15, wherein to accept the virtual goods package, the instructions further cause the processor to:
  generate based on the receiving link, a virtual goods package claim request, the virtual goods package claim request comprising a recipient identifier of the client device and a virtual goods package identifier of the virtual goods package;
  send the virtual goods package claim request to the server, wherein the virtual goods package claim request causes the server to detect that the client device satisfies a claim condition and determine that a type of the virtual goods package corresponding to the virtual goods package claim request is share;
  receive a sharing interface, the sharing interface comprising an instruction to share the virtual goods package with a sharing client device;
  send based on the sharing interface, a virtual goods package sharing request comprising the virtual goods package identifiers and sharing client information, wherein the server sends the virtual goods package to the sharing client device based on the instruction.

\* \* \* \* \*